US012748363B2

(12) United States Patent

Fukui et al.

(10) Patent No.: US 12,748,363 B2
(45) Date of Patent: Sep. 29, 2026

(54) ROLLER DRIVING APPARATUS USED IN IMAGE FORMING APPARATUS

(71) Applicant: CANON KABUSHIKI KAISHA, Tokyo (JP)

(72) Inventors: Yuichi Fukui, Kanagawa (JP); Shunsuke Uratani, Shizuoka (JP); Tsuyoshi Ogawa, Tokyo (JP); Soichi Ishii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/905,950

(22) Filed: Oct. 3, 2024

(65) Prior Publication Data

US 2025/0116952 A1 Apr. 10, 2025

(30) Foreign Application Priority Data

Oct. 5, 2023 (JP) ................................ 2023-173396

(51) Int. Cl.
*G03G 15/08* (2006.01)
*G03G 15/00* (2006.01)
*G03G 21/16* (2006.01)

(52) U.S. Cl.
CPC ....... *G03G 15/0808* (2013.01); *G03G 15/757* (2013.01); *G03G 21/1647* (2013.01); *G03G 2215/0177* (2013.01); *G03G 2221/1657* (2013.01)

(58) Field of Classification Search
CPC ............. G03G 15/0808; G03G 15/757; G03G 21/1647; G03G 2215/0177; G03G 2221/1657
See application file for complete search history.

(56) References Cited

U.S. PATENT DOCUMENTS

2006/0171739 A1* 8/2006 Nakaya .............. G03G 21/1647 399/119
2020/0348622 A1* 11/2020 Matsumoto ........ G03G 15/0808

FOREIGN PATENT DOCUMENTS

JP H086457 A 1/1996
JP 2001013848 A 1/2001
JP 2022089991 A 6/2022

* cited by examiner

*Primary Examiner* — Sandra Brase
(74) *Attorney, Agent, or Firm* — Canon U.S.A., Inc. I.P. Division

(57) ABSTRACT

A roller driving apparatus includes a roller having a shaft, and a gear fixed to a first end portion of the shaft, wherein the gear includes a hole into which the first end portion is inserted and formed of an inner peripheral surface including an inner circumferential surface centering on a first center, a projection, in a case where two areas divided by a virtual line passing through the first center are first area and areas, disposed in the first area and projecting relative to the inner peripheral surface, and a gear portion, wherein the first end portion of the shaft is inserted into the hole of the gear in a press-fit state, and wherein, when viewed along the longitudinal direction, a second center, which is a center of a pitch circle of the gear portion, is disposed in the second area.

14 Claims, 21 Drawing Sheets area1 area 2

ROLLER DRIVING APPARATUS USED IN IMAGE FORMING APPARATUS

BACKGROUND

Field

The present disclosure relates to a roller driving apparatus used in an electrophotographic image forming apparatus.

Description of the Related Art

With the increase in a rotational variation of a process unit (e.g., a developing roller or a toner supply roller) of an image forming apparatus employing an electrophotographic image forming process, an image unevenness may occur at intervals of the rotation of the roller.

Japanese Patent Application Laid-Open No. 2022-89991 discloses a configuration for press-fitting a roller shaft into a gear to prevent the increase in rotational variations of a developing roller and a toner supply roller.

SUMMARY

According to some embodiments, a roller driving apparatus used in an image forming apparatus includes a roller having a shaft and configured to be rotatably driven, and a gear fixed to a first end portion of the shaft in a longitudinal direction of the roller, wherein the gear includes, when viewed along the longitudinal direction, a hole into which the first end portion of the shaft is inserted and formed of an inner peripheral surface including an inner circumferential surface centering on a first center, a projection, in a case where two areas divided by a virtual line passing through the first center are a first area and a second area, disposed in the first area and projecting in a direction approaching the first center relative to the inner peripheral surface, and a gear portion disposed so that a pitch circle is provided outside the hole in a radial direction centering on the first center, wherein the first end portion of the shaft is inserted into the hole of the gear in a press-fit state by at least a part of the projection of the gear being deformed, and wherein, when viewed along the longitudinal direction, a second center, which is a center of the pitch circle, is disposed in the second area.

Further features of the present disclosure will become apparent from the following description of exemplary embodiments with reference to the attached drawings.

DESCRIPTION OF THE EMBODIMENTS

Various exemplary embodiments, features, and aspects of the present disclosure will be described as illustrative in detail below with reference to the accompanying drawings. However, sizes, materials, shapes, and relative arrangements of components according to the following exemplary embodiments are to be modified as desired depending on the configuration of an apparatus according to the present disclosure and other various conditions. Therefore, unless otherwise specifically described, the scope of the present disclosure is not limited to the following exemplary embodiments.

<Overall Configuration of Printer>

Figure 2:
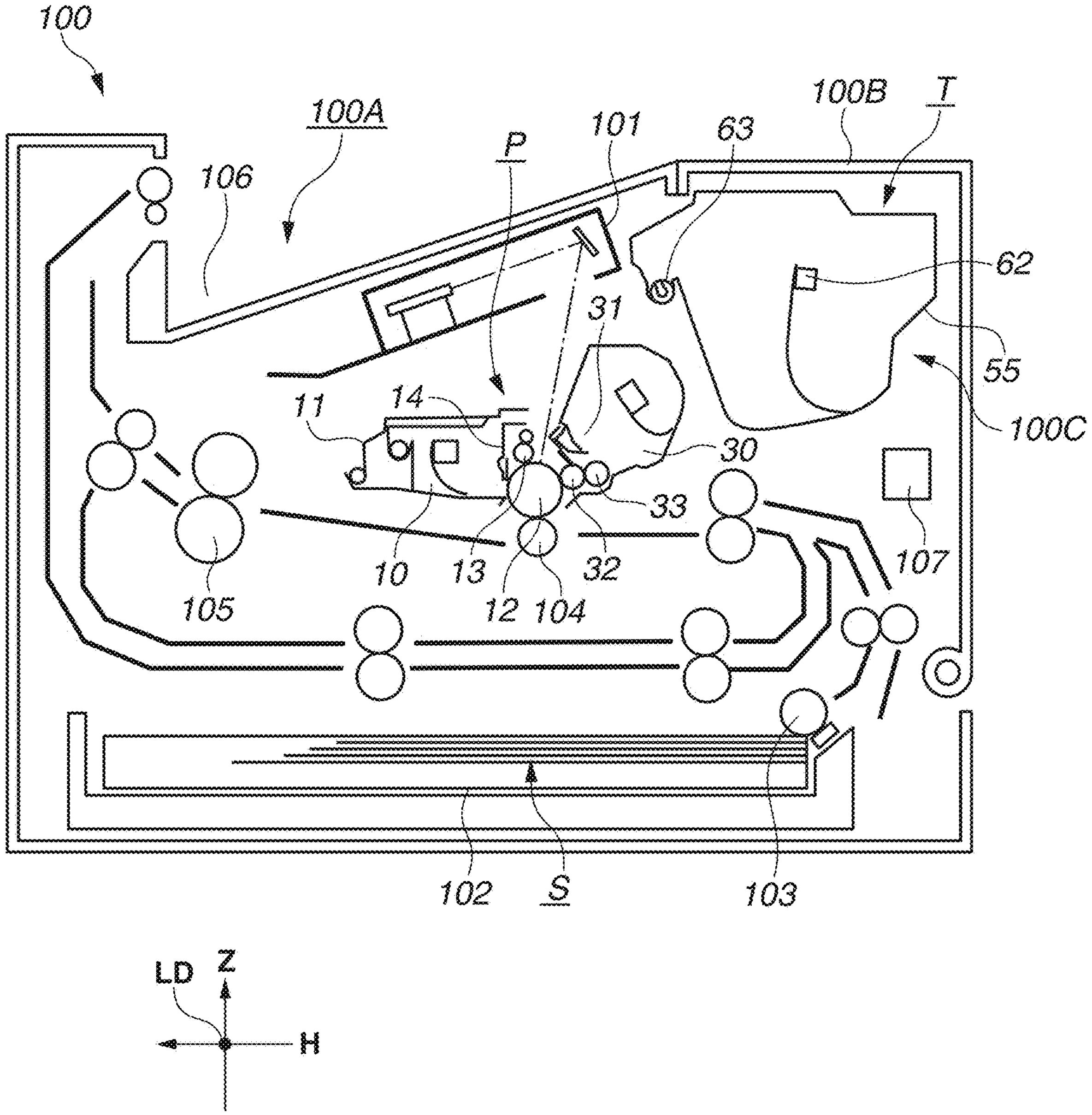
FIG. 2 is a schematic cross-sectional view illustrating a configuration of a printer.

A basic configuration and operations of a printer 100 as an image forming apparatus according to a first exemplary embodiment will be described below with reference to FIG. 2. FIG. 2 is a schematic cross-sectional view illustrating a configuration of the printer 100 according to the present exemplary embodiment. The arrow Z indicates the vertical direction and the arrow H indicates the horizontal direction.

As illustrated in FIG. 2, the printer 100 includes an apparatus main body 100A, a process cartridge P and a toner cartridge T as cartridges detachably attached to the apparatus main body 100A.

The apparatus main body 100A includes a scanner 101 as an exposure apparatus, a stacking tray 102 for stacking sheets S, a feed roller 103, a transfer roller 104, a fixing unit 105, a discharge tray 106, and a control unit 107. The process cartridge P and the toner cartridge (developer cartridge) T are detachably attached to the apparatus main body 100A.

The process cartridge P includes a photosensitive drum 12, a cleaning blade (cleaning unit) 14, a charging roller (charging member) 13, a drum unit 10 having a drum frame 11, and a developing unit 30 having a developing roller 32 and a developing frame 31. The photosensitive drum 12 is rotatably supported by the drum frame 11. The developing roller 32 is rotatably supported by the developing frame 31.

The toner cartridge T is attachable to the process cartridge P. The toner cartridge T stores toner as a developer and is configured to supply toner to the developing unit 30 of the process cartridge P. The toner cartridge T includes a toner conveyance member 62, a toner conveyance screw 63, a roller 72, an element 73, and a toner frame 55. The toner conveyance member 62 and the toner conveyance screw 63 are rotatably supported at 62*c* by element 62*b* and the toner frame 55. The element 73 extends along a longitudinal axis 73*a* and the roller 72 is rotatably supported about a rotational axis 72*a* and the toner frame 55.

An image forming operation on a sheet S will be described below. The control unit 107 of the printer 100 starts the image forming operation on the sheet S based on a signal received from an external apparatus.

Firstly, the photosensitive drum 12 is rotated by the driving source of the apparatus main body 100A. The charging roller 13 is rotated by the photosensitive drum 12 with a charging voltage being applied to the charging roller 13. As a result, the surface of the photosensitive drum 12 is uniformly charged. The scanner 101 emits laser to the charged surface of the photosensitive drum 12 based on image information to form an electrostatic latent image on the surface of the photosensitive drum 12.

The developing roller 32 supplies toner to the photosensitive drum 12 to develop the electrostatic latent image as a toner image. When the photosensitive drum 12 rotates, the toner image formed on the photosensitive drum 12 is conveyed to a transfer portion formed between the transfer roller 104 and the photosensitive drum 12.

Meanwhile, the sheet S is supplied from the stacking tray 102 by the feed roller 103. The sheet S is conveyed to the transfer portion in synchronization with the timing when the toner image formed on the photosensitive drum 12 reaches the transfer portion.

When a transfer voltage is applied to the transfer roller 104, the toner image is transferred from the photosensitive drum 12 to the sheet S. Residual toner not having been transferred to the sheet S is removed from the surface of the photosensitive drum 12 by the cleaning blade 14.

The sheet S with the toner image transferred thereon is conveyed to the fixing unit 105. When the sheet S passes through the fixing unit 105, the toner image is heated and pressurized by the fixing unit 105 to be fixed to the sheet S.

The printer 100 according to the present exemplary embodiment can perform double-sided printing for performing an image forming operation on the front and back surfaces of the sheet S. If an image is to be formed only on the front surface of the sheet S, the sheet S having passed through the fixing unit 105 is discharged onto the discharge tray 106. On the other hand, if double-sided printing is to be performed, the sheet S with a toner image fixed to the front surface is conveyed again to the transfer portion via a double-sided conveyance path, and then a toner image is formed on the back surface of the sheet S. Then, the sheet S passes through the fixing unit 105 and then discharged onto the discharge tray 106.

<Attaching and Detaching Process Cartridge and Toner Cartridge>

The attachment and detachment of the process cartridge P and the toner cartridge T according to the present exemplary embodiment will be described below with reference to FIGS. 2 to 6.

Figure 3:
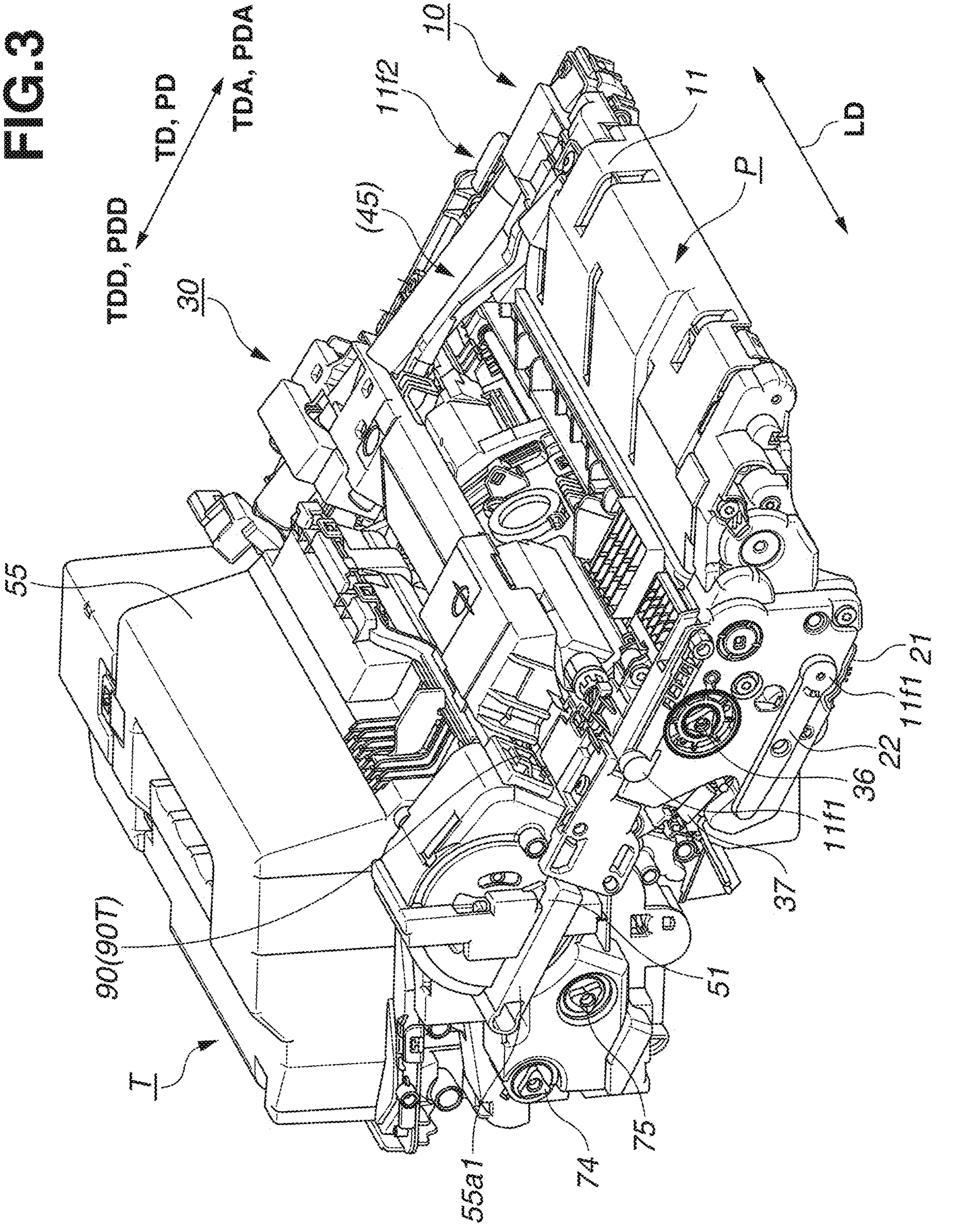
FIG. 3 is a perspective view illustrating a process cartridge and a toner cartridge.
Figure 4:
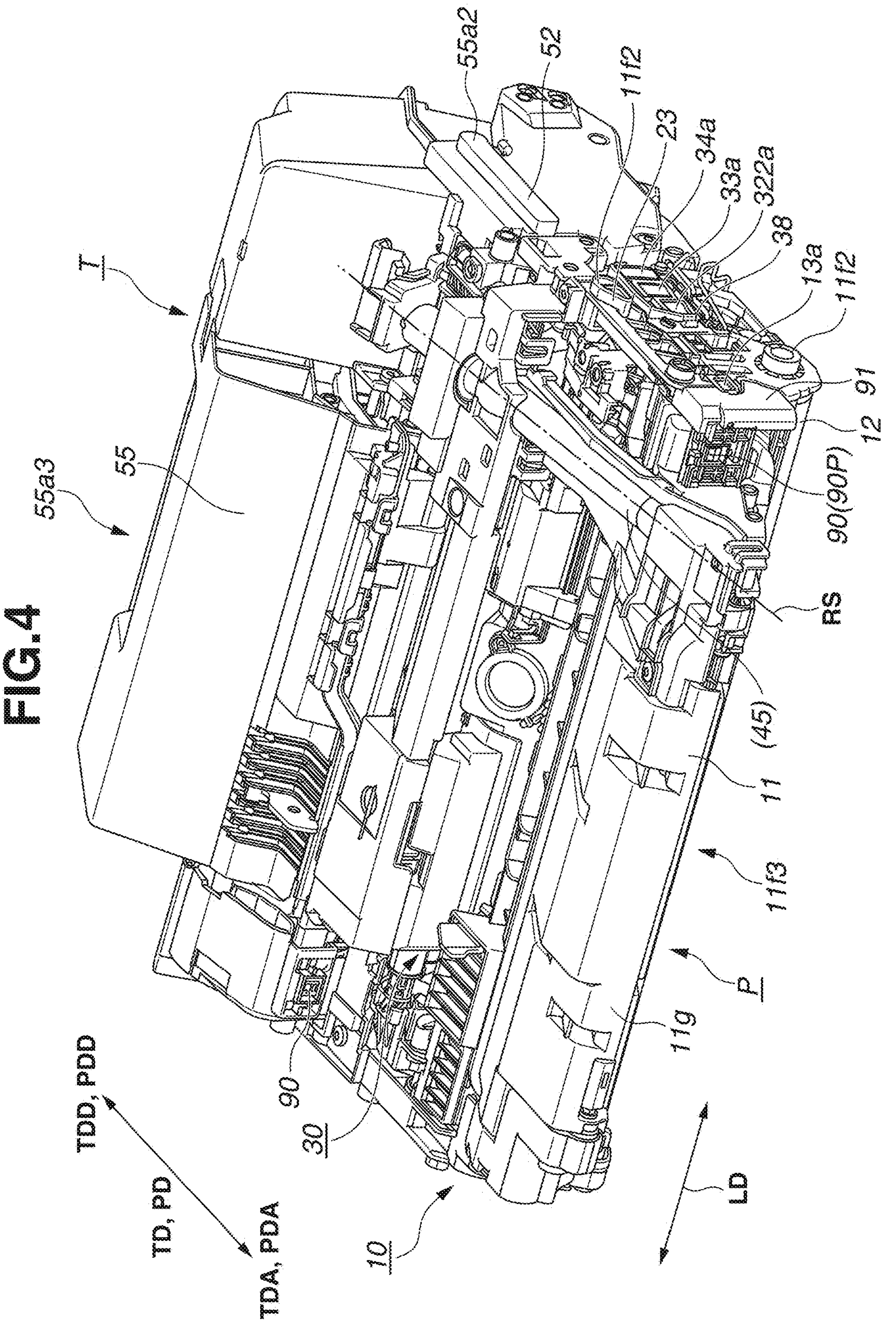
FIG. 4 is another perspective view illustrating the process cartridge and the toner cartridge.

FIGS. 3 and 4 are perspective views illustrating the process cartridge P and the toner cartridge T.

Figure 5:
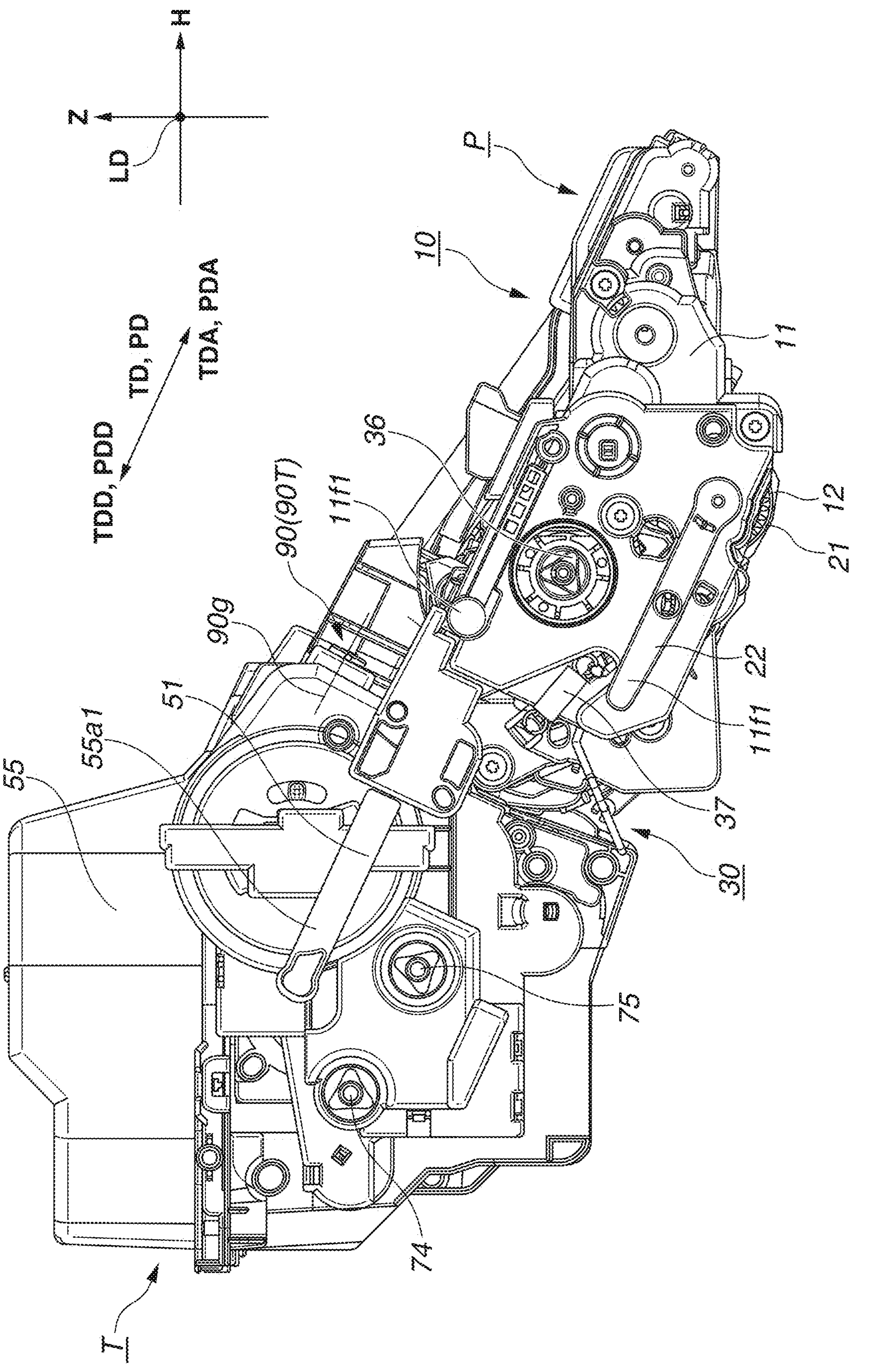
FIG. 5 is a side view illustrating the process cartridge and the toner cartridge.
Figure 6:
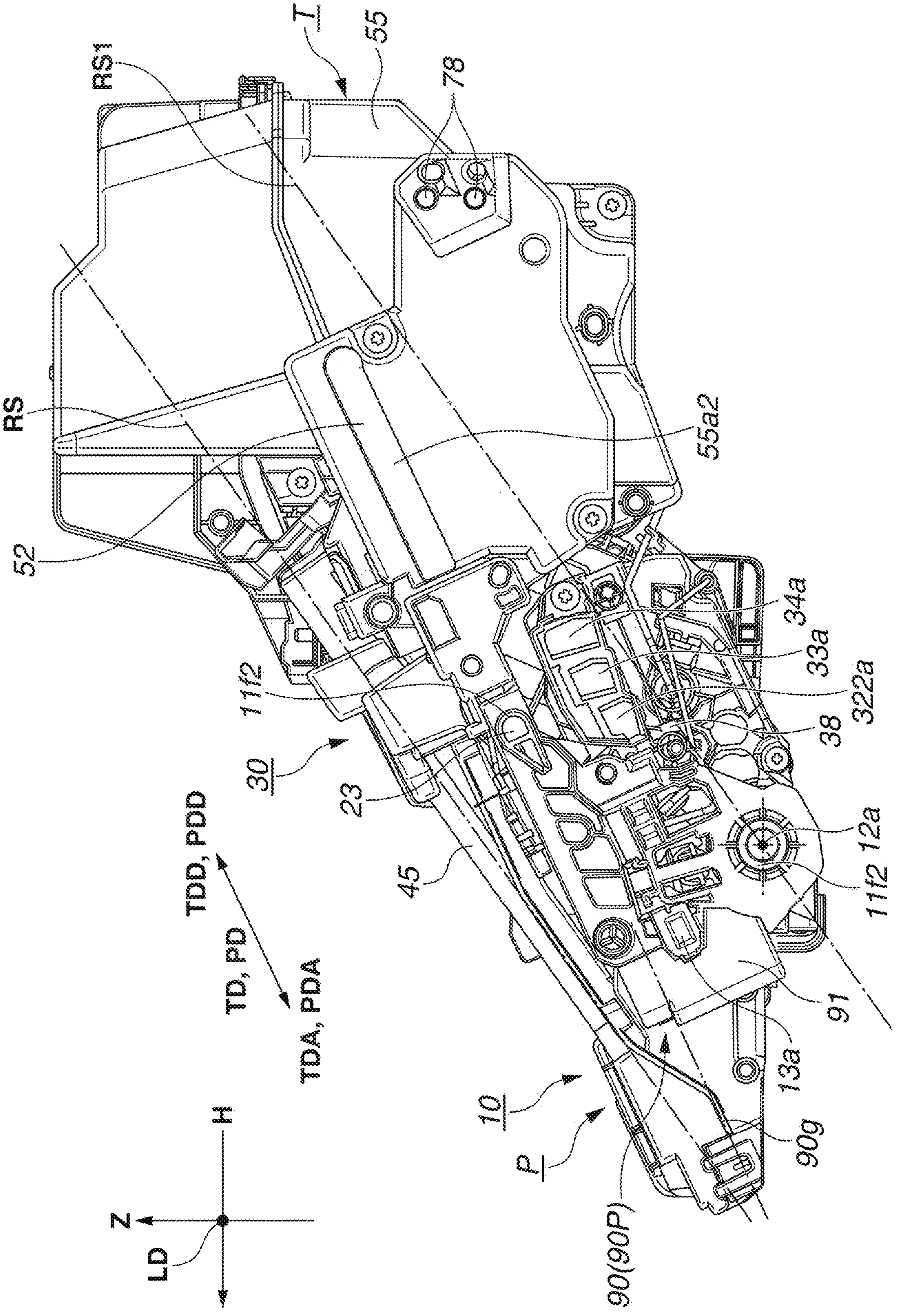
FIG. 6 is another side view illustrating the process cartridge and the toner cartridge.

FIGS. 5 and 6 are side views illustrating the process cartridge P and the toner cartridge T.

As illustrated in FIG. 6, the photosensitive drum 12 is rotatable around a rotational axis (first axis) 12*a*. The direction in which the rotational axis 12*a* extends is referred to as a rotational axis direction (axis direction) of the photosensitive drum 12.

FIG. 3 is a perspective view illustrating the process cartridge P and the toner cartridge T viewed from the drive side. FIG. 4 is a perspective view illustrating the process cartridge P and toner cartridge T viewed from the non-drive side. FIG. 5 is a side view illustrating the drive side of the process cartridge P and the toner cartridge T viewed along the rotational axis direction of the photosensitive drum 12. FIG. 6 is a side view illustrating the non-drive side of the process cartridge P and the toner cartridge T viewed along the rotational axis direction of the photosensitive drum 12.

As illustrated in FIG. 2, the printer 100 has a door (opening and closing member) 100B for covering an opening 100C of the apparatus main body 100A. The door 100B is rotatably attached to the apparatus main body 100A. The door 100B is configured to be movable between the closing position where the opening 100C is covered and the open position where the opening 100C is exposed. In a state where the door 100B is at the open position, the process cartridge P and the toner cartridge T are allowed to be attached to and detached from the apparatus main body 100A through the opening 100C.

As illustrated in FIGS. 3 and 4, the drum frame 11 has a process drive end 11*f*1 (the first end of the drum frame 11) and a process non-drive end 11*f*2 (the second end of the drum frame 11) on the side opposite to the process drive end 11*f*1 in the rotational axis direction of the photosensitive drum 12. The process drive end 11*f*1 and the process non-drive end 11*f*2 are most outward portions (ends) of the drum frame 11 in the rotational axis direction of the photosensitive drum 12. There may be a plurality of the process drive ends 11*f*1 and a plurality of the process non-drive ends 11*f*2. The center of the drum frame 11 in the rotational axis direction of the photosensitive drum 12 is referred to as a center 11*f*3. The distance from the center 11*f*3 to the process drive end 11*f*1 of the drum frame 11 equals the distance from the center 11*f*3 to the process non-drive end 11*f*2 thereof.

According to the present exemplary embodiment, the process drive end 11*f*1 and the process non-drive end 11*f*2 are most outward portions (ends) of the process cartridge P in the rotational axis direction of the photosensitive drum 12. More specifically, the process drive end 11*f*1 and the process non-drive end 11*f*2 coincide with the drive end of the process cartridge P (the first end of the process cartridge P) and the non-drive end (the second end of the process cartridge P), respectively, in the rotational axis direction of the photosensitive drum 12.

The side where the process drive end 11*f*1 and the drum frame portion 11*g* is disposed relative to the center 11*f*3 of the drum frame 11 in the rotational axis direction of the photosensitive drum 12 is the drive side of the drum frame 11 or the drive side of the process cartridge P. The side where the process non-drive end 11*f*2 is disposed relative to the center 11*f*3 of the drum frame 11 in the rotational axis direction o7f the photosensitive drum 12 is the non-drive side of the drum frame 11 or the non-drive side of the process cartridge P. According to the present exemplary embodiment, the center 113 of the drum frame 11 in the rotational axis direction of the photosensitive drum 12 coincides with the center of the process cartridge P.

The drive side of the drum frame 11 or the drive side of the process cartridge P is positioned on the side opposite to the non-drive side of the drum frame 11 or the non-drive side of the process cartridge P, respectively, in the rotational axis direction of the photosensitive drum 12.

As described below, the toner conveyance member 62 is rotatable about a rotational axis 62*a*. The direction in which the rotational axis 62*a* extends is referred to as a rotational axis direction (axis direction) of the toner conveyance member 62.

The toner conveyance screw 63 is rotatable about the rotational axis 63*a* below element 53. The direction in which the rotational axis 63*a* extends is referred to as a rotational axis direction (axis direction) of the toner conveyance screw 63.

The toner frame 55 has a toner drive end 55*a*1 (the first end of the toner frame 55) and a toner non-drive end 55*a*2 (the second end of the toner frame 55) opposite to the toner drive end 55*a*1 in the rotational axis direction of the toner conveyance screw 63. The toner drive end 55*a*1 and the toner non-drive end 55*a*2 are most outward portions (ends) of the toner frame 55 in the rotational axis direction of the toner conveyance screw 63. The center of the toner frame 55 in the rotational axis direction of the toner conveyance screw 63 is referred to as a center 55*a*3. The distance from the center 55*a*3 to the toner drive end 55*a*1 of the toner frame 55 equals the distance from the center 11*f*3 to the toner non-drive end 55*a*2 thereof.

According to the present exemplary embodiment, the toner drive end 55*a*1 and the toner non-drive end 55*a*2 are most outward portions (ends) of the toner cartridge T in the rotational axis direction of the toner conveyance screw 63. More specifically, the toner drive end 55*a*1 and the toner non-drive end 55*a*2 coincide with the drive end of the toner cartridge T (the first end of the toner cartridge T) and the non-drive end thereof (the second end of the toner cartridge T), respectively, in the rotational axis direction of the toner conveyance screw 63.

The side where the toner drive end 55*a*1 is disposed relative to the center 55*a*3 of the toner frame 55 in the rotational axis direction of the toner conveyance screw 63 is the drive side of the toner frame 55 or the drive side of the toner cartridge T. The side where the toner non-drive end 55*a*2 is disposed relative to the center 55*a*3 of the toner frame 55 in the rotational axis direction of the toner conveyance screw 63 is the non-drive side of the toner frame 55 or the non-drive side of the toner cartridge T. According to the present exemplary embodiment, the center 55*a*3 of the toner frame 55 in the rotational axis direction of the toner conveyance screw 63 coincides with the center of the toner cartridge T.

The drive side of the toner frame 55 or the drive side of the toner cartridge T is positioned on the side opposite to the non-drive side of the toner frame 55 or the non-drive side of the toner cartridge T, respectively, in the rotational axis direction of the toner conveyance screw 63.

According to the present exemplary embodiment, the rotational axis direction of the photosensitive drum 12, the rotational axis direction of the toner conveyance member 62, and the rotational axis direction of the toner conveyance screw 63 are parallel to each other. Therefore, the rotational axis direction of the photosensitive drum 12, the rotational axis direction of the toner conveyance member 62, and the rotational axis direction of the toner conveyance screw 63 are simply referred to as an axis direction (first direction) LD.

According to the present exemplary embodiment, the position of the center 55*a*3 of the toner frame 55 coincides with the position of the center 11*f*3 of the drum frame 11 in the axis direction LD. However, the position of the center 55*a*3 of the toner frame 55 may be different from the position of the center 11*f*3 of the drum frame 11.

As illustrated in FIGS. 3 and 5, the process cartridge P is provided with a drive side process guide 22 on the drive side of the drum frame 11. The toner cartridge T is provided with a drive side toner guide 51 and drive input members 74 and 75 on the drive side of the toner frame 55. As illustrated in FIGS. 4 and 6, the process cartridge P is provided with a non-drive side process guide 23 on the non-drive side of the drum frame 11. The toner cartridge T is provided with a non-drive side toner guide 52 on the non-drive side of the toner frame 55.

The direction in which the process cartridge P is attached to the apparatus main body 100A is referred to as an attachment direction PDA. The direction in which the process cartridge P is detached from the apparatus main body 100A is referred to as a detachment direction PDD. The attachment direction PDA and the detachment direction PDD are collectively referred to as an attachment/detachment direction PD. The drive side process guide 22 and the non-drive side process guide 23 are formed along the attachment/detachment direction PD. The drive side process guide 22 and the non-drive side process guide 23 are guided by the guide unit of the apparatus main body 100A, and the process cartridge P moves in the attachment/detachment direction PD relative to the apparatus main body 100A.

The direction in which the toner cartridge T is attached to the apparatus main body 100A is referred to as an attachment direction TDA. The direction in which the toner cartridge T is detached from the apparatus main body 100A is referred to as a detachment direction TDD. The attachment direction TDA and the detachment direction TDD are collectively referred to as an attachment/detachment direction TD. The drive side toner guide 51 and the non-drive side toner guide 52 are formed along the attachment/detachment direction TD. The drive side toner guide 51 and the non-drive side toner guide 52 are guided by the guide unit of the apparatus main body 100A, and the toner cartridge T moves relative to the apparatus main body 100A in the attachment/detachment direction TD.

According to the present exemplary embodiment, the attachment/detachment direction PD intersects with the axis direction LD. Preferably, the angle formed by the direction orthogonal to the axis direction LD and the attachment/detachment direction PD is smaller than the angle formed by the axis direction LD and the attachment/detachment direction PD. More preferably, the attachment/detachment direction PD is orthogonal to the axis direction LD.

According to the present exemplary embodiment, the attachment/detachment direction TD intersects with the axis direction LD. Preferably, the angle formed by the direction orthogonal to the axis direction LD and the attachment/detachment direction TD is smaller than the angle formed by the axis direction LD and the attachment/detachment direction TD. More preferably, the attachment/detachment direction TD is orthogonal to the axis direction LD.

Although, according to the present exemplary embodiment, the attachment/detachment directions TD and PD are parallel to each other, the attachment/detachment directions PD and TD may be different.

According to the present exemplary embodiment, the process cartridge P is attached or detached in a state where the toner cartridge T is not attached to the apparatus main body 100A. In other words, the process cartridge P is attached or detached before the toner cartridge T is attached to the apparatus main body 100A.

In a state where toner cartridge T is not attached to the apparatus main body 100A, the process cartridge P is attached to the apparatus main body 100A through the opening 100C. In a state where the process cartridge P is attached to the apparatus main body 100A, the toner cartridge T is attached to the apparatus main body 100A and the process cartridge P through the opening 100C.

In a state where the toner cartridge T and the process cartridge P are attached to the apparatus main body 100A, the process cartridge P is positioned downstream of the toner cartridge T in the attachment directions PDA and TDA.

When detaching the toner cartridge T and the process cartridge P from the apparatus main body 100A, the toner cartridge T is detached from the apparatus main body 100A and the process cartridge P through the opening 100C. Then, the process cartridge P is detached from the apparatus main body 100A through the opening 100C.

<Process Cartridge>

The configuration of the process cartridge P according to the present exemplary embodiment will be described in more detail below with reference to FIGS. 3 to 10.

Figure 7:
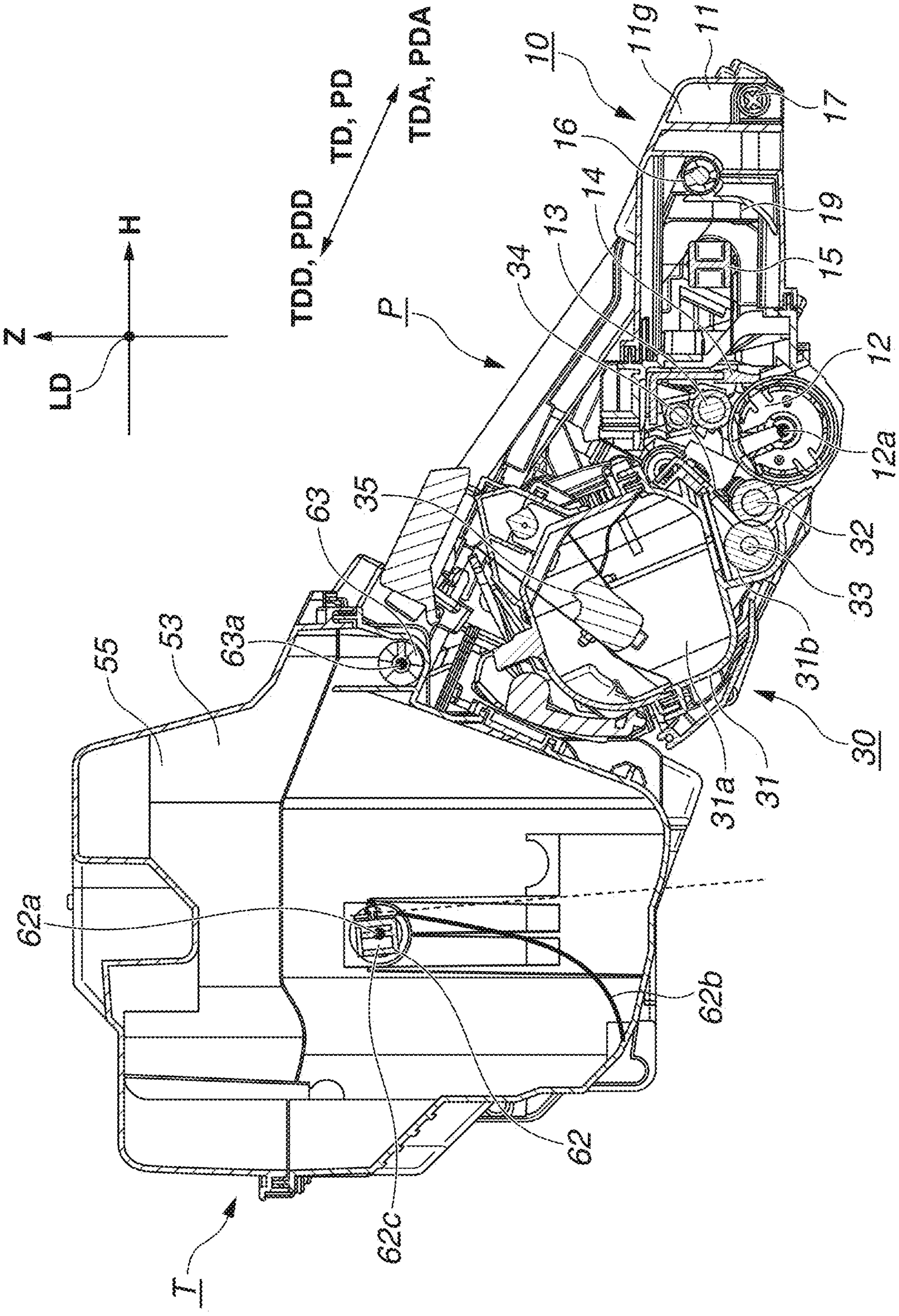
FIG. 7 is a cross-sectional view illustrating the process cartridge and the toner cartridge.
Figure 8:
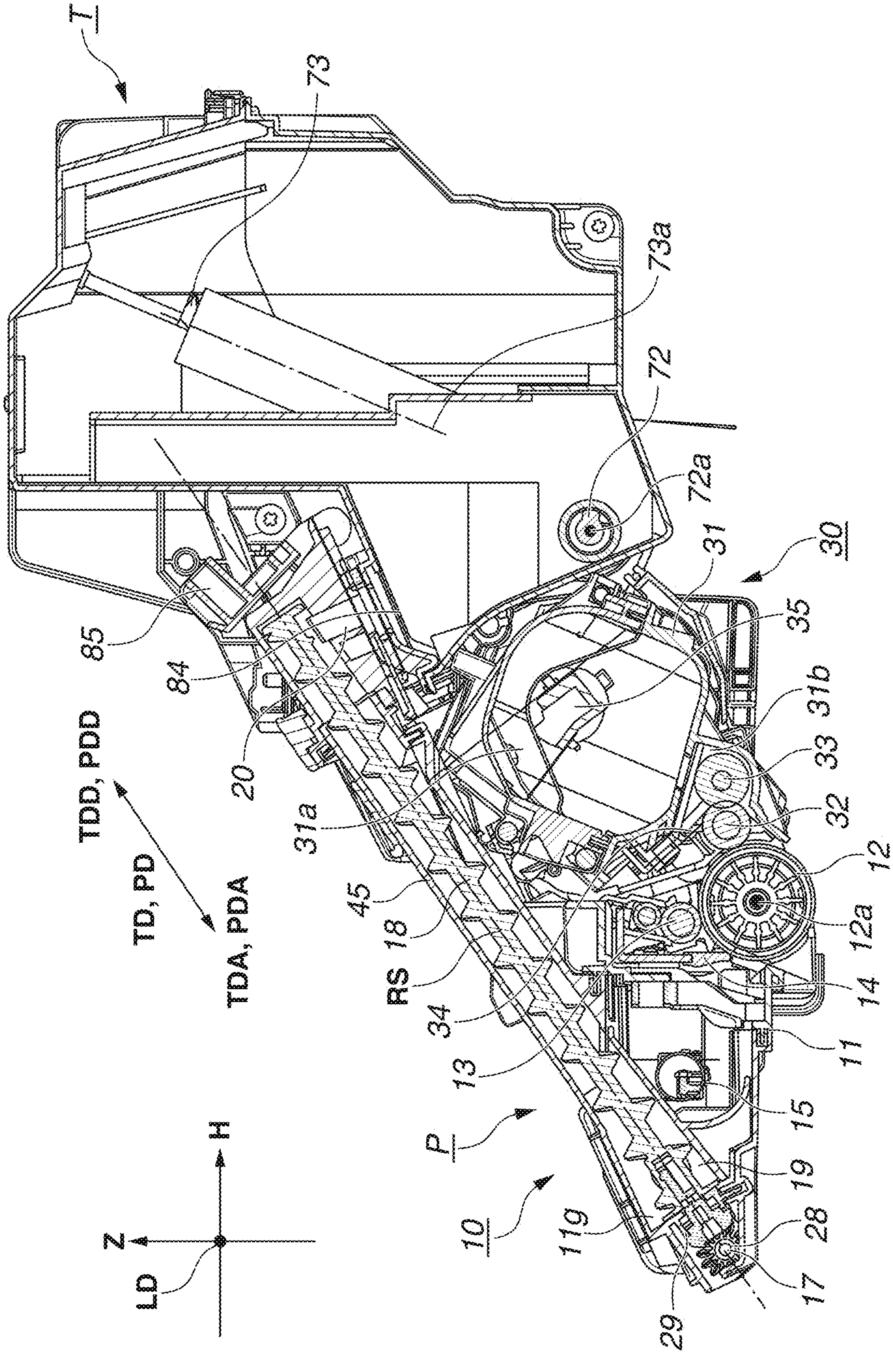
FIG. 8 is another cross-sectional view illustrating the process cartridge and the toner cartridge.

FIGS. 7 and 8 are cross-sectional views illustrating the process cartridge P and the toner cartridge T.

More specifically, FIGS. 7 and 8 are cross-sectional views illustrating the process cartridge P and the toner cartridge T, taken along the direction orthogonal to the axis direction LD. FIG. 8 is a cross-sectional view illustrating the process cartridge P and the toner cartridge T, taken along a rotational axis RS of a return screw 18 (described below).

Figure 9:
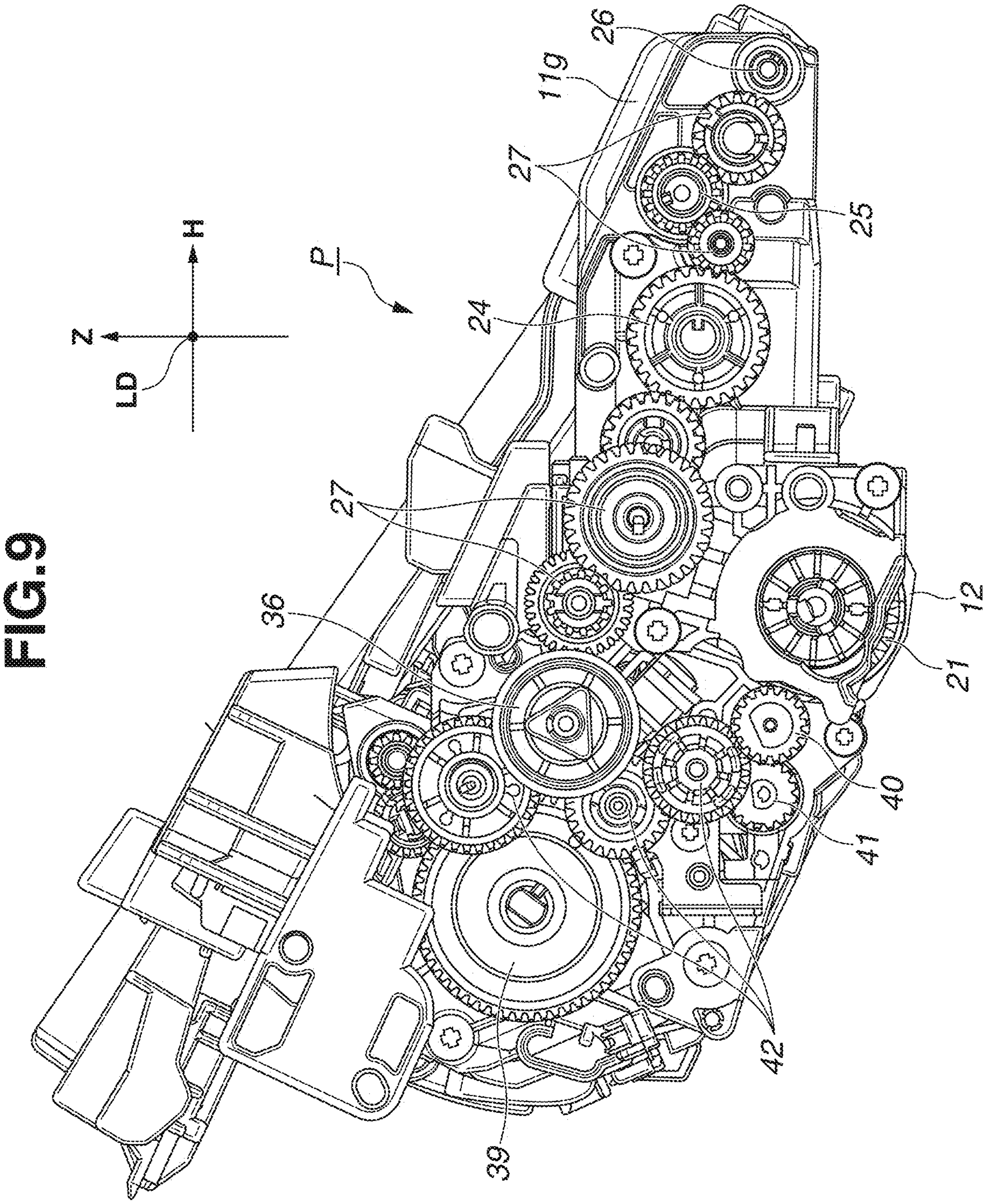
FIG. 9 is a side view illustrating a drive transmission path in the process cartridge.
Figure 10:
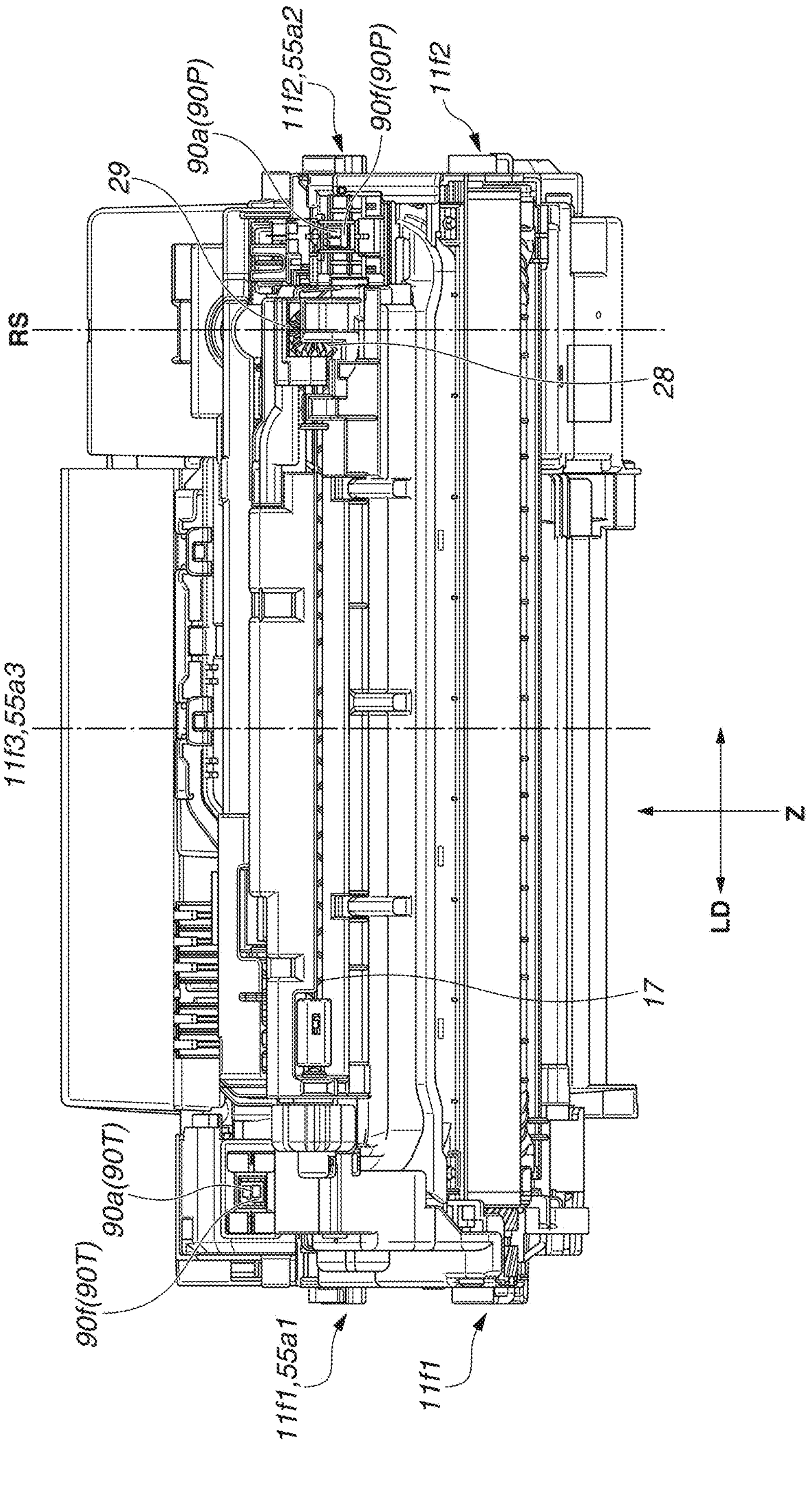
FIG. 10 illustrates the process cartridge and the toner cartridge viewed along a detachment direction.

FIG. 9 is a side view illustrating a drive transmission path of the process cartridge P. FIG. 10 illustrates the process cartridge P and the toner cartridge T viewed along the detachment direction PDD.

The process cartridge P includes the developing unit 30 and the drum unit 10. The developing unit 30 is movably (rotatably) connected with the drum unit 10. As illustrated in FIGS. 5 and 6, the process cartridge P has a drive side spring 37 and a non-drive side spring 38 each of which is attached to the drum unit 10 and the developing unit 30. The drive side spring 37 and the non-drive side spring 38 bias the developing unit 30 so that the developing roller 32 is pressed toward the photosensitive drum 12.

As illustrated in FIGS. 7 and 8, the developing unit 30 includes a developing frame 31, a developing roller 32 (developer carrier) for carrying toner, a supply roller 33 (supply member) abutting the developing roller 32 to supply toner to the developing roller 32, a developing blade 34, and a stirring member 35. The developing frame 31 rotatably supports the developing roller 32, the supply roller 33, the developing blade 34, and the stirring member 35. The developing frame 31 includes a developer storage chamber 31*a* and a developing chamber 31*b*. The developer storage chamber 31*a* includes the stirring member 35, and the developing chamber 31*b* includes the developing roller 32, the supply roller 33, and the developing blade 34.

The toner supplied from the toner cartridge T is stored in the developer storage chamber 31*a*. The stirring member 35 conveys the toner stored in the developer storage chamber 31*a* to the developing chamber 31*b*. The toner conveyed to the developing chamber 31*b* is supplied to the developing roller 32 by the supply roller 33 rotating in contact with the developing roller 32. The toner supplied to the developing roller 32 is regulated by the developing blade 34, and a toner layer is formed on the surface of the developing roller 32.

The developing blade 34 serves as a layer thickness regulation member for regulating the thickness of the toner layer.

As illustrated in FIGS. 7 and 8, the drum unit 10 includes the drum frame 11, the photosensitive drum 12 (image carrier), the charging roller 13, the cleaning blade 14, an intermediate conveyance member 15, an intermediate screw 16, a transmission shaft 17, and the return screw 18. The drum frame 11 supports the photosensitive drum 12, the charging roller 13, the cleaning blade 14, the intermediate conveyance member 15, the intermediate screw 16, the transmission shaft 17, and the return screw 18. The drum unit 10 is provided with one or more memory tags 90, 90(90T), 90(90P), 90*a*(90T), 90*a*(90P), 90*f*(90T), that may be along axes 90G (see FIGS. 3-6 and 10).

The drum frame 11 includes a cleaning collection chamber 19. The cleaning collection chamber 19 includes the intermediate conveyance member 15, the intermediate screw 16, and the return screw 18.

As illustrated in FIG. 8, the drum frame 11 is provided with a return path 45 for storing the return screw 18. The return path 45 is a part of the cleaning collection chamber 19.

The charging roller 13 in contact with the photosensitive drum 12 is rotated by the photosensitive drum 12. The cleaning blade 14 in contact with the photosensitive drum 12 collects residual toner on the surface of the photosensitive drum 12. The collected toner (waste toner, residual toner, and collected toner) is stored in the cleaning collection chamber 19. The collected toner is conveyed toward the intermediate screw 16 by the intermediate conveyance member 15, and the intermediate screw 16 conveys the collected toner toward the return screw 18. The intermediate conveyance member 15 conveys the collected toner in the direction intersecting with the axis direction LD. The intermediate screw 16 conveys the collected toner along the axis direction LD.

The return screw (rotating member) 18 rotates about the rotational axis (second axis) RS. The direction in which the rotational axis RS of the return screw 18 extends is referred to as a rotational axis direction (second direction) of the return screw 18.

The rotational axis direction of the return screw 18 intersects with the axis direction LD. Preferably, the angle formed by the direction orthogonal to the axis direction LD and the rotational axis direction of the return screw 18 is smaller than the angle formed by the axis direction LD and the rotational axis direction of the return screw 18. More preferably, the rotational axis direction of the return screw 18 is orthogonal to the axis direction LD.

As illustrated in FIG. 8, the drum frame 11 is provided with a return opening 20 near element 85. The return opening 20 communicates with the return path 45 of the cleaning collection chamber 19 and the outside of the drum frame 11, and faces the return screw 18. The collected toner transferred from the intermediate screw 16 to the return screw 18 is conveyed toward the return opening 20 by the return screw 18 and then discharged from the return opening 20. The collected toner passes through a toner inlet 84 (described below) and is received by the toner cartridge T.

The return screw 18 serves as a conveyance member for conveying the toner collected from the photosensitive drum 12 toward the toner inlet 84. The direction in which the return screw 18 conveys the collected toner is the direction from the process cartridge P toward the toner cartridge T and the vertically upward direction.

The return screw 18 having a spiral fin and a screw shaft rotates about the rotational axis RS to convey toner toward the return opening 20. The spiral fin and the screw shaft are integrally formed.

As illustrated in FIGS. 3 and 5, the process cartridge P is provided with a drive input member 36 (drive input coupling) and a drum gear 21. When the drive input member 36 engages with a main body coupling (not illustrated) of the apparatus main body 100A, a driving force is transmitted from the apparatus main body 100A to the drive input member 36. More specifically, a drive is input from the outside of the process cartridge P to the drive input member 36. When the drum gear 21 engages with a main body gear (not illustrated) of the apparatus main body 100A, a driving force (external force) is transmitted from the apparatus main body 100A to the drum gear 21, thus rotating the drum gear 21. When the drum gear 21 rotates, the photosensitive drum 12 is driven to rotate.

According to the present exemplary embodiment, the drive input member 36 and the drum gear 21 are disposed on the drive side of the process cartridge P. More specifically, the distance between the process drive end **11*f*1 and the drive input member 36 is shorter than the distance between the process non-drive end 11*f*2 and the drive input member 36 in the axis direction LD. Likewise, the distance between the process drive end 11*f*1 and the drum gear 21 is shorter than the distance between the process non-drive end 11*f*2 and the drum gear 21** in the axis direction LD.

As illustrated in FIG. 9, the process cartridge P includes a stirring gear 39 for driving the stirring member 35, a developing gear 40 for driving the developing roller 32, and a supply gear 41 for driving the supply roller 33. The stirring gear 39, the developing gear 40, and the supply gear 41 are connected with the drive input member 36 via a plurality of idler gears (a first idler gear 42, a second idler gear 43, and a third idler gear 44). When the drive input member 36 rotates, the developing roller 32, the supply roller 33, and the stirring member 35 are driven to rotate.

The process cartridge P includes an intermediate conveyance gear 24 for driving the intermediate conveyance member 15, an intermediate screw gear 25 for driving the intermediate screw 16, and a shaft gear 26 for driving the transmission shaft 17. The intermediate conveyance gear 24, the intermediate screw gear 25, and shaft gear 26 are connected with the drive input member 36 via a plurality of idler gears 27. When the drive input member 36 rotates, the intermediate conveyance member 15, the intermediate screw 16, and the transmission shaft 17 rotate.

The return path 45 and the return screw 18 are disposed on the non-drive side of the process cartridge P (see FIGS. 3 and 9). More specifically, the distance between the return screw 18 and the process non-drive end **11*f*2 is shorter than the distance between the return screw 18 and the process drive end 11*f*1** in the axis direction LD.

More specifically, as illustrated in FIG. 10, the distance between the rotational axis RS and the process non-drive end **11*f*2 is shorter than the distance between the rotational axis RS and the process drive end 11*f*1 in the axis direction LD. Also, the distance between the rotational axis RS and the process non-drive end 11*f*2 is shorter than the distance between the rotational axis RS and the center 11*f*3 of the drum frame 11** in the axis direction LD.

As illustrated in FIG. 8, a transmission gear 28 is attached to the transmission shaft 17, and a return gear 29 that engages with the transmission gear 28 is attached to the return screw 18. The transmission gear 28 and the return gear 29 are bevel gears. The return screw 18 rotates as the transmission shaft 17 rotates. More specifically, the driving force transmitted to the drive input member 36 is transmitted from the drive side of the process cartridge P to the non-drive side of the process cartridge P and then transmitted to the return screw 18 by the transmission shaft 17. More specifically, the drive input member 36 is configured to drive the return screw 18.

As illustrated in FIG. 10, the transmission shaft 17 is disposed outside the cleaning collection chamber 19, and the transmission gear 28 and the return gear 29 engage with each other outside the cleaning collection chamber 19.

As illustrated in FIGS. 4 and 6, a developing roller electrode (developing roller contact) **322*a*, a developing blade electrode (developing blade contact) 34*a*, a supply roller electrode (supply roller contact) 33*a*, and a charging roller electrode (charging roller contact) 13*a* are disposed on the non-drive side of the process cartridge P near element 91. More specifically, the distance between the process non-drive end 11*f*2 and the charging roller electrode 13*a* is shorter than the distance between the process drive end 11*f*1 and the charging roller electrode 13*a*. Likewise, the distances between the process non-drive end 11*f*2 and the developing roller electrode 322*a*, the developing blade electrode 34*a*, and the supply roller electrode 33*a* are shorter than the distances between the process drive end 11*f*1 and the developing roller electrode 322*a*, the developing blade electrode 34*a*, and the supply roller electrode 33*a***, respectively.

The developing roller electrode **322*a*, the developing blade electrode 34*a*, the supply roller electrode 33*a*, and the charging roller electrode 13*a* are electrically connected with the developing roller 32, the developing blade 34, the supply roller 33, and the charging roller 13 electrically, respectively. When the image forming operation is performed, predetermined voltages from the power source of the apparatus main body 100A are applied to the developing roller electrode 322*a*, the developing blade electrode 34*a*, the supply roller electrode 33*a*, and the charging roller electrode 13*a***.

The developing roller electrode **322*a*, the developing blade electrode 34*a*, the supply roller electrode 33*a*, and charging roller electrode 13*a*** may be made of a metal or a conductive resin.

According to the present exemplary embodiment, the rotational axis directions of the developing roller 32, the supply roller 33, the stirring member 35, the charging roller 13, the intermediate conveyance member 15, the intermediate screw 16, and the transmission shaft 17 are parallel to the axis direction LD. The rotational axis directions of the gears other than the drive input member 36, the drum gear 21, and the return gear 29 are also parallel to the axis direction LD.

(Drive Configuration of Developing Unit)

A drive configuration of the developing unit 30 having the configuration of the present disclosure will be described in more detail below.

Figure 11:
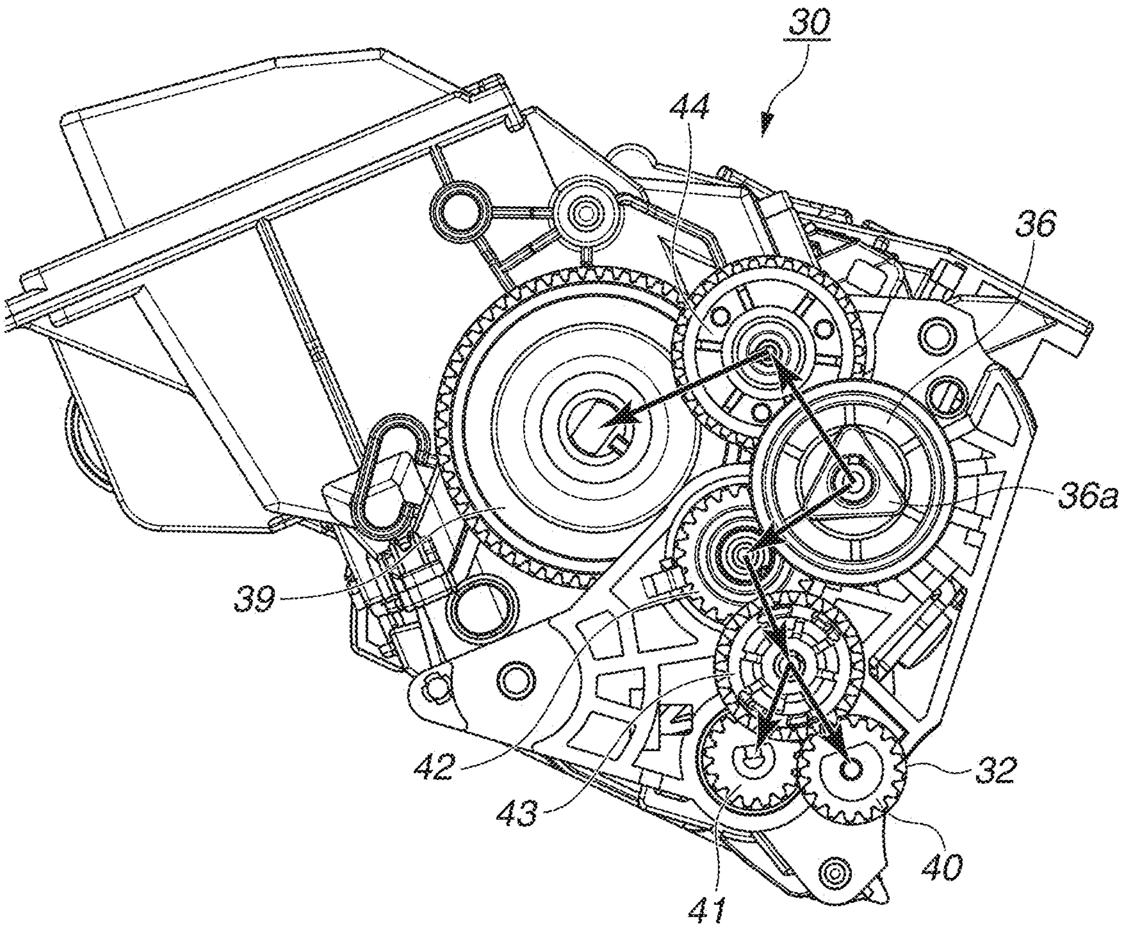
FIG. 11 is a side view illustrating a drive configuration of a developing unit.
Figure 12:
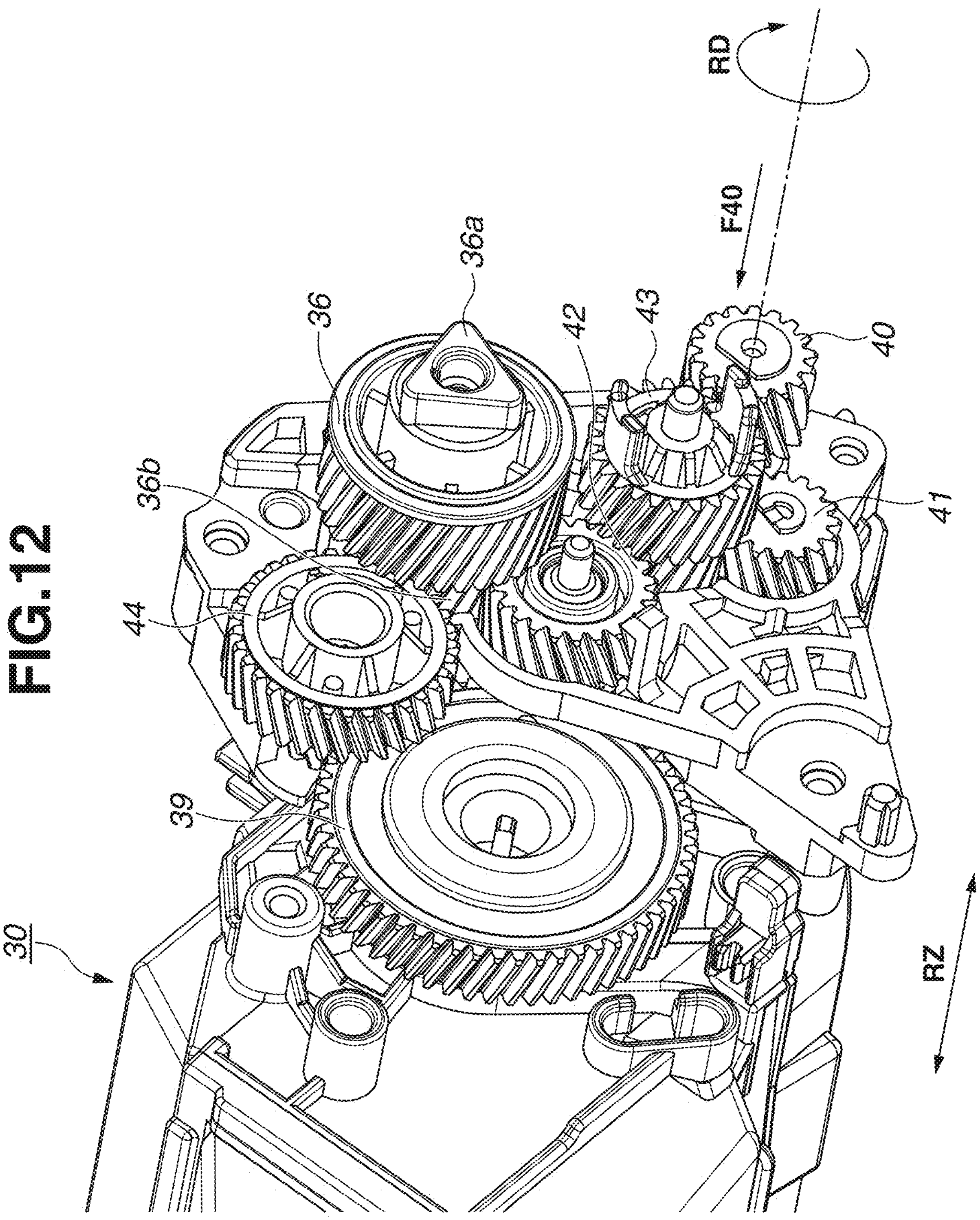
FIG. 12 is a perspective view illustrating the drive configuration of the developing unit.

FIG. 11 is a side view illustrating the drive configuration of the developing unit 30. FIG. 12 is a perspective view illustrating the drive configuration of the developing unit 30.

As illustrated in FIGS. 11 and 12, the developing unit 30 includes a drive input member 36 (driving force reception member). The drive input member 36 has a coupling portion **36*a* projecting in the axis direction LD illustrated in FIG. 12. When the coupling portion 36*a* engages with a main body coupling (not illustrated) of the apparatus main body 100A, the driving force (external force) is transmitted from the apparatus main body 100A to the drive input member 36**.

The developing unit 30 includes a stirring gear 39 for driving the stirring member 35, the developing gear 40 for driving the developing roller 32, and the supply gear 41 for driving the supply roller 33. The configuration for attaching the developing gear 40 to the developing roller 32 will be described below. The supply gear 41 is attached to a longitudinal end of the supply roller 33 so as to rotate with the supply roller 33. The stirring gear 39 is attached to a longitudinal end of the stirring member 35 so as to rotate with the stirring member 35. The developing unit 30 also includes the first idler gear 42 that connects with a gear 36*b* of the drive input member 36. The developing unit 30 further includes the second idler gear 43 that connects with the first idler gear 42 and with the developing gear 40 and the supply gear 41. The developing unit 30 further includes the third idler gear 44 that connects with the gear 36*b* of the drive input member 36 and with the stirring gear 39. When the drive input member 36 receives a driving force to be rotated, the developing roller 32, the supply roller 33, and the stirring member 35 are driven to rotate through the rotations of the first idler gear 42, the second idler gear 43, and the third idler gear 44. The rotational axis directions of the developing roller 32, the supply roller 33, and the stirring member 35 coincide with the axis direction LD (hereinafter referred to as an RZ direction). The stirring gear 39, the developing gear 40, the supply gear 41, the first idler gear 42, the second idler gear 43, and the third idler gear 44 are helical gears.

When the developing gear 40 receives a driving force from the third idler gear 44 to be rotated in the RD direction in FIG. 12, the developing gear 40 receives a thrust force F40. The direction of the thrust force F40 is the direction from an end to the center of the developing roller 32 in the longitudinal direction. The supply gear 41 also receives a similar thrust force.

(Gear Shapes)

Figure 13:
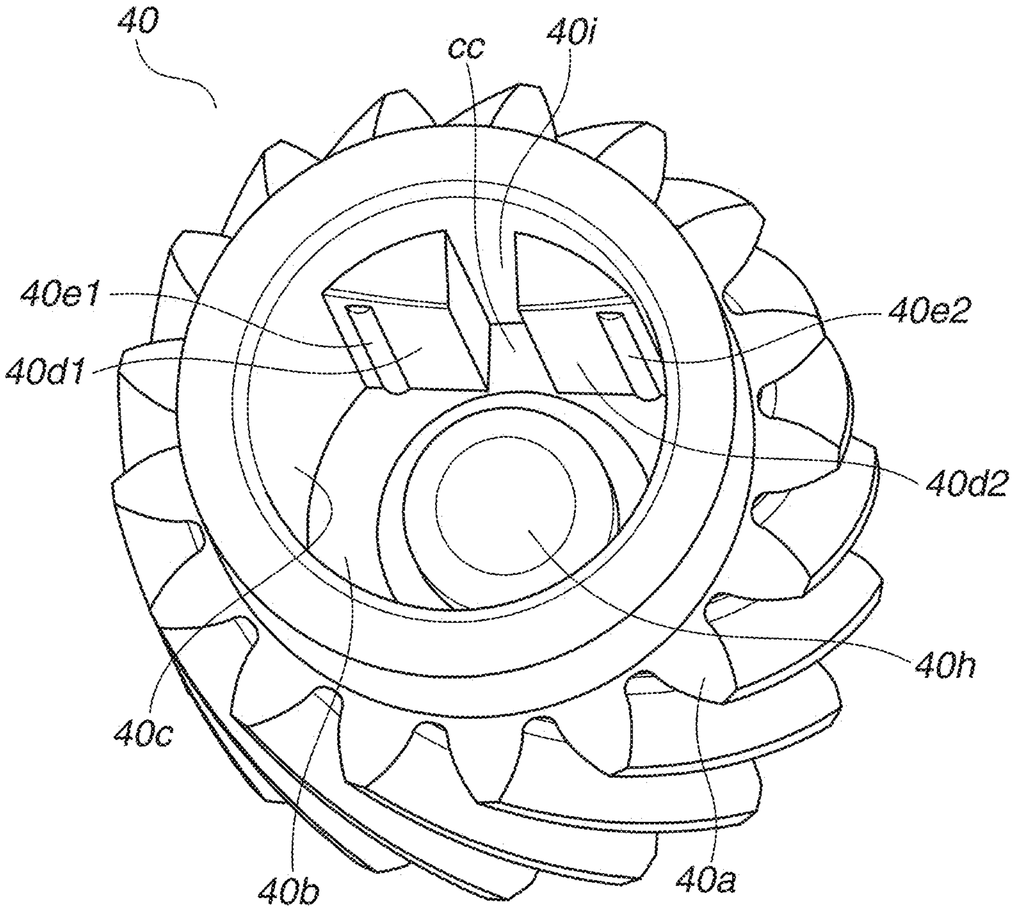
FIG. 13 is a perspective view illustrating a developing gear.
Figure 14:
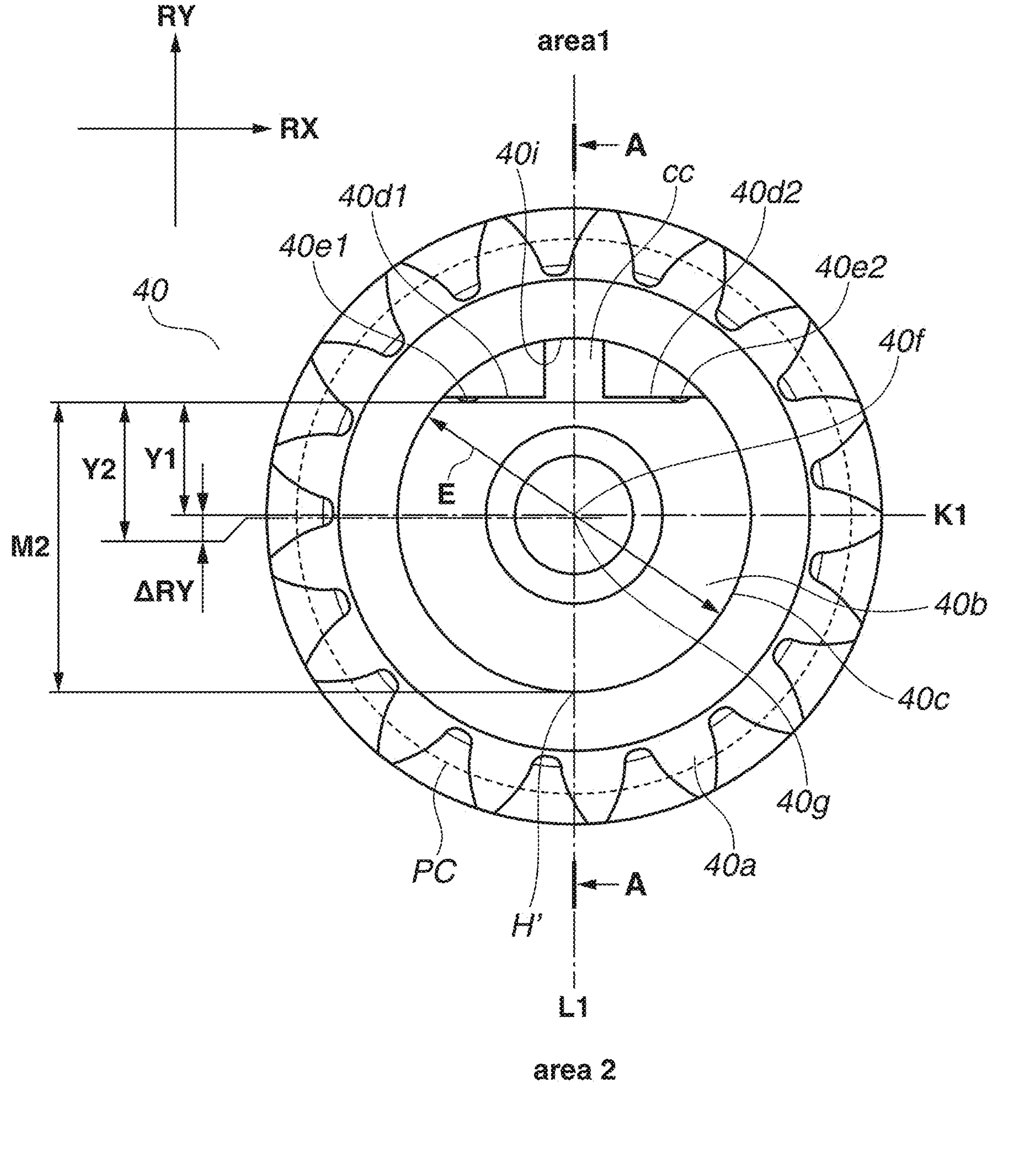
FIG. 14 is a front view illustrating the developing gear.
Figure 15:
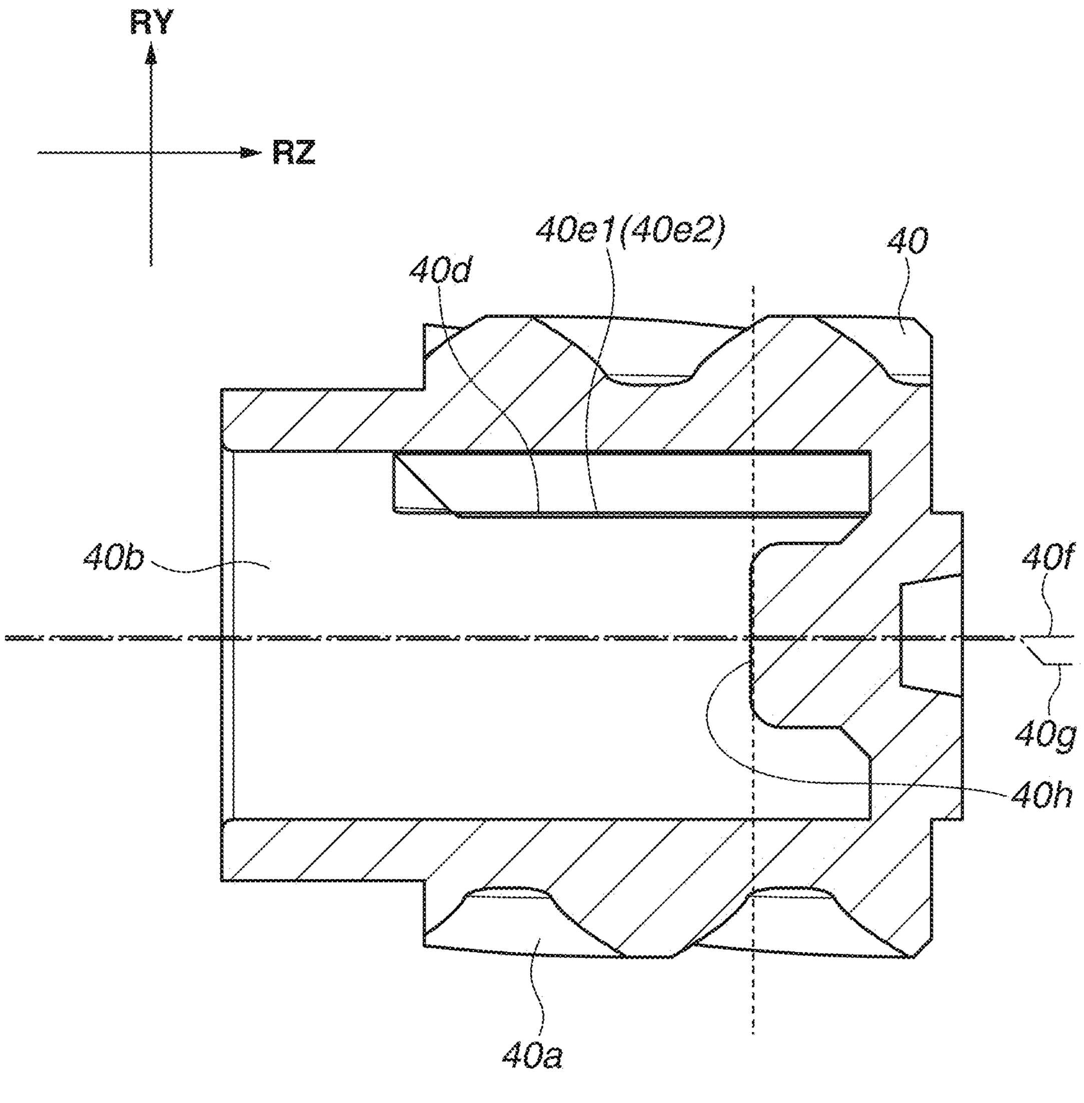
FIG. 15 is a cross-sectional view illustrating the developing gear.
Figure 16A:
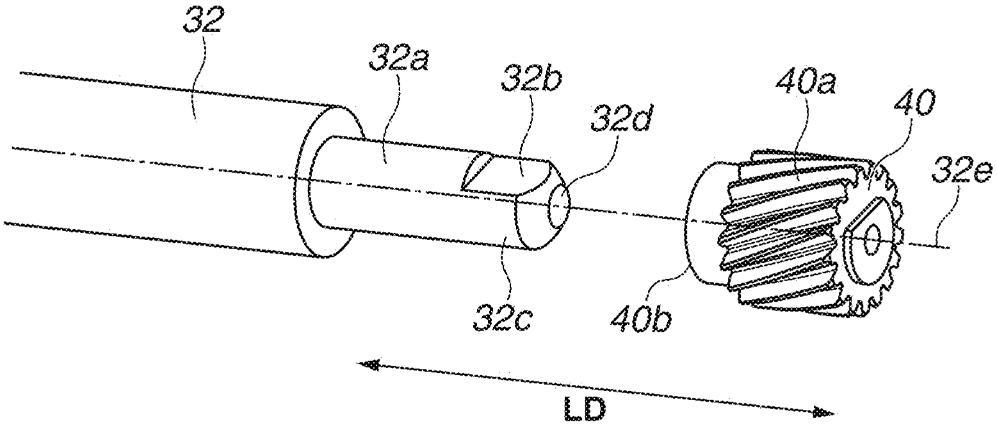
FIGS. 16A and 16B are perspective views illustrating a developing roller and the developing gear.
Figure 16B:
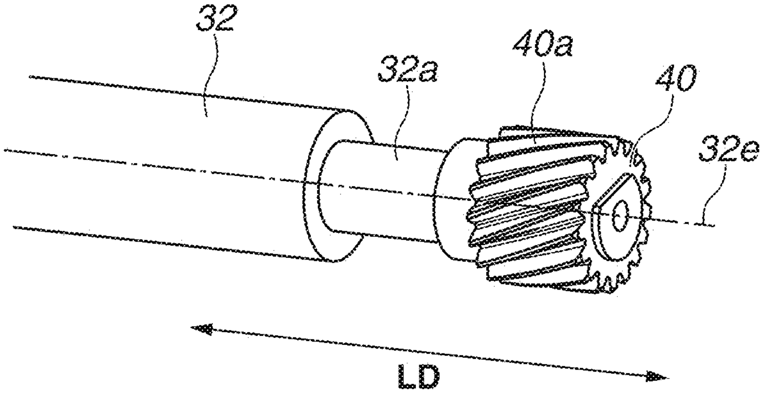

The developing gear 40 will be described in more detail below with reference to FIGS. 13 to 16. FIG. 13 is a perspective view illustrating the developing gear 40. FIG. 14 is a front view illustrating the developing gear 40 viewed along the axis direction LD (RZ direction). FIG. 15 is a cross-sectional view taken along the A-A line in FIG. 14. FIG. 16A is a perspective view illustrating the developing roller 32 before attaching the developing gear 40. FIG. 16B is a perspective view illustrating the developing roller 32 after attaching the developing gear 40.

As illustrated in FIGS. 13 to 16, the developing gear 40 has a gear 40*a* that connects with the second idler gear 43. The developing gear 40 has a hole 40*b* into which the shaft 32*a* of the developing roller 32 is to be inserted. The inner peripheral surface of the hole 40*b* includes an inner circumferential surface 40*c*, a first inner flat surface 40*d*1, a second inner flat surface 40*d*2, an inner circumferential surface 40*i* between the first inner flat surface 40*d*1 and the second inner flat surface 40*d*2.

The first inner flat surface 40*d*1 and the second inner flat surface 40*d*2 are parallel to each other. When viewed along the RZ direction, the direction parallel to the first inner flat surface 40*d*1 is referred to as an RX direction, and the direction perpendicular to the first inner flat surface 40*d*1 is referred to as an RY direction. The first inner flat surface 40*d*1 and the second inner flat surface 40*d*2 are disposed at the same position in the RY direction. The inner circumferential surface 40*i* is the bottom surface of a concave portion cc recessed relative to the first inner flat surface 40*d*1 and the second inner flat surface 40*d*2 in a direction away from a hole center 40*f* (first center) in the RY direction. The inner circumferential surface 40*i* is not necessarily a circumferential surface as in the present exemplary embodiment but may be a flat surface. The hole center 40*f* is the center of the inner circumferential surface 40*c* when viewed along the RZ direction.

The hole 40*b* of the developing gear 40 includes a first projection 40*e*1 and a second projection 40*e*2 projecting from the first inner flat surface 40*d*1 and the second inner flat surface 40*d*2, respectively, in the direction approaching the hole center 40*f* in the RY direction. The first projection 40*e*1 and the second projection 40*e*2 are parallelly disposed in the RX direction. As illustrated in FIG. 14, the developing gear 40 is divided into two different areas, an area 1 and an area 2, by a virtual straight line K1 that is parallel to the RX direction and passes through the hole center 40*f*. The first inner flat surface 40*d*1, the second inner flat surface 40*d*2, the first projection 40*e*1, and the second projection 40*e*2 are disposed in the area 1. Further, the first projection 40*e*1 and the second projection 40*e*2 are disposed on the sides opposite to each other with respect to a virtual straight line L1 that is parallel to the RY direction and passes through the hole center 40*f*. The first projection 40*e*1 and the second projection 40*e*2 are disposed on the sides opposite to each other across the concave portion cc in the RX direction in FIG. 14. The concave portion cc is disposed at a position through which the virtual straight line L1 passes. As illustrated in FIG. 15, the first projection 40*e*1 and the second projection 40*e*2 are formed in a range (at the same position) where the gear 40*a* overlaps with the first projection 40*e*1 (second projection 40*e*2) in the RZ direction. More specifically, when viewed along the RY direction, the gear 40*a* overlaps with the first projection 40*e*1 (second projection 40*e*2).

A positional relation between the hole 40*b* and the gear 40*a* will be described below. As illustrated in FIG. 14, the distance from the apex of the first projection 40*e*1 to the hole center 40*f* in the RY direction is referred to as a distance Y1. The center of the gear 40*a* is referred to as a gear center 40*g* (second center). The distance from the apex of the first projection 40*e*1 (second projection 40*e*2) to the gear center 40*g* in the RY direction is referred to as a distance Y2. The gear 40*a* of the developing gear 40 is disposed so that a pitch circle PC exists outside the hole 40*b* in the radial direction centering on the hole center 40*f* The gear 40*a* of the developing gear 40 is formed so that the distance Y2 is larger than the distance Y1. More specifically, the gear center 40*g* is formed at a position deviated from the hole center 40*f* of the hole 40*b* by a difference ΔRY (=Y2−Y1) in a direction away from the first projection 40*e*1 (second projection 40*e*2) in the RY direction. The gear center 40*g* is disposed in the area 2. The difference ΔRY will be described below.

The gear center 40*g* is the center of the pitch circle PC of the gear 40*a*.

Figure 1:
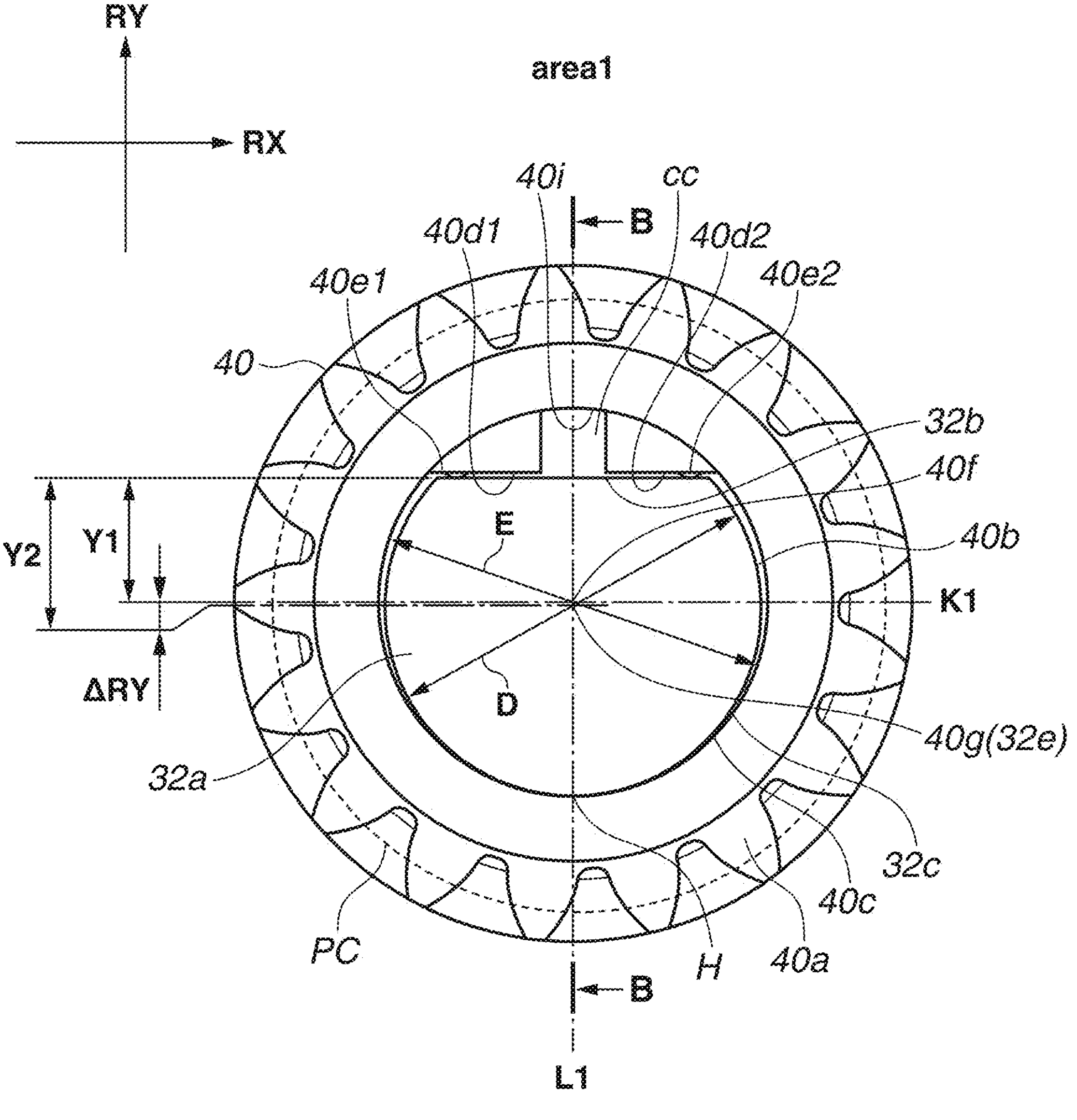
FIG. 1 is a front view illustrating a developing gear with a developing roller according to a first exemplary embodiment inserted.
Figure 17:
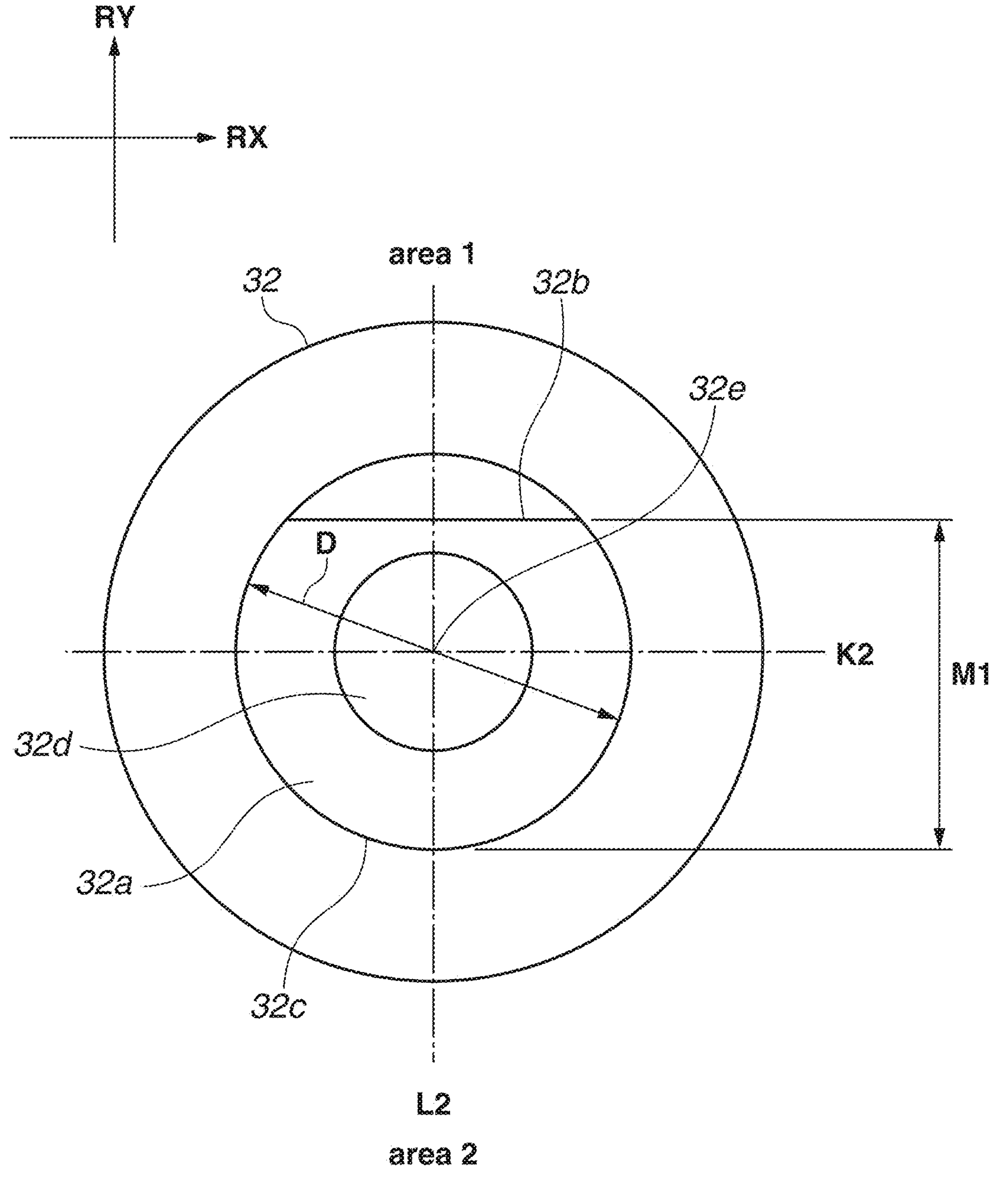
FIG. 17 is a side view illustrating the developing roller.
Figure 18:
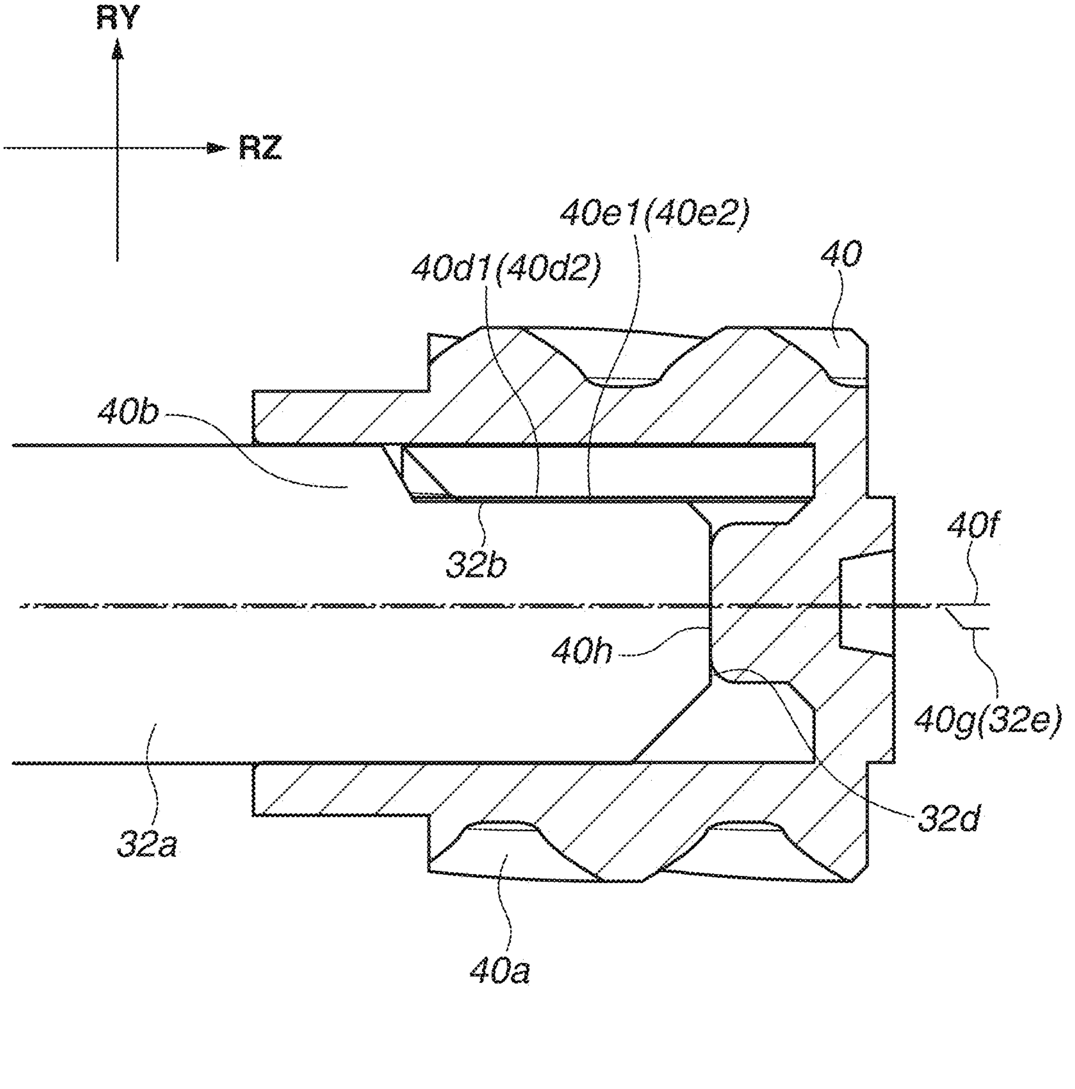
FIG. 18 is a cross-sectional view illustrating the developing gear with the developing roller inserted.

A method for fixing the developing gear 40 to the shaft 32*a* of the developing roller 32 will be described below with reference to FIGS. 1, 17, and 18. FIG. 1 is a front view illustrating the developing gear 40 after the shaft 32*a* of the developing roller 32 is inserted into the hole 40*b* of the developing gear 40. More specifically, FIG. 1 illustrates the developing gear 40 and the shaft 32*a* viewed along the longitudinal direction of the developing roller 32. FIG. 17 is a side view illustrating the developing roller 32. FIG. 18 is a cross-sectional view illustrating the developing gear 40 after the shaft 32*a* of the developing roller 32 is inserted into the hole 40*b* of the developing gear 40, taken along the B-B line of FIG. 1.

As illustrated in FIG. 16A, the shaft 32*a* (first end) of the developing roller 32 has an outer flat surface 32*b*, an outer circumferential surface 32*c*, and an end face 32*d*. The center of the outer circumferential surface 32*c* is referred to as a shaft center 32*e*. As illustrated in FIG. 17, when the virtual line passing through the shaft center 32*e* and perpendicular to the outer flat surface 32*b* is referred to as a virtual straight line L2, the distance from the outer flat surface 32*b* to an intersection point H of the virtual straight line L2 and the outer circumferential surface 32*c* is referred to as a distance M1. More specifically, the distance M1 is the width of the shaft 32*a* in the RY direction. On the other hand, as illustrated in FIG. 14, the distance from the apexes of the first projection 40*e*1 and the second projection 40*e*2 of the developing gear 40 to an intersection point H' of the virtual straight line L1 and the inner circumferential surface 40*c* is referred to as a distance M2. The distance M2 is the width of the hole 40*b* in the RY direction. In a state where the shaft 32*a* is not press-fit into the hole 40*b* of the developing gear 40, the distance M1, which is the width of the shaft 32*a* in the RY direction, is larger than the distance M2, which is the width of the hole 40*b* in the RY direction. As illustrated in FIGS. 14 and 17, the outer diameter D of the outer circumferential surface 32*c* is smaller than the outer diameter E of the inner circumferential surface 40*c* of the developing gear 40. More specifically, the radius of the outer circumferential surface 32*c* is smaller than the radius of the inner circumferential surface 40*c*.

When assembling the developing gear 40 with the developing roller 32, the shaft 32*a* of the developing roller 32 is inserted into the hole 40*b* of the developing gear 40 so that the outer flat surface 32*b* of the shaft 32*a* is approximately parallel to the first inner flat surface 40*d*1 and the second inner flat surface 40*d*2 of the developing gear 40.

As illustrated in FIG. 18, when the end face 32*d* of the developing roller 32 inserted into the developing gear 40 comes into contact with an inner end face 40*h* of the developing gear 40, the position of the developing gear 40 relative to the developing roller 32 in the RZ direction is determined. When the shaft 32*a* of the developing roller 32 is inserted into the hole 40*b* of the developing gear 40, as illustrated in FIG. 1, the first projection 40*e*1 and the second projection 40*e*2 of the developing gear 40 come into contact with the outer flat surface 32*b*, and a contact portion H of the inner circumferential surface 40*c* of the developing gear 40 comes into contact with the outer circumferential surface 32*c*. More specifically, as illustrated in FIG. 1, the contact portion H is positioned in the area 2 relative to the virtual straight line K1 and on the virtual straight line L1.

Since the distance M1 of the shaft 32*a* is larger than the distance M2 of the hole 40*b* of the developing gear 40, the shaft 32*a* is press-fit into the hole 40*b*. The shaft 32*a* is inserted into the hole 40*b* of the developing gear 40 in a press-fit state by at least a part of the first projection 40*e*1 and the second projection 40*e*2 being deformed. In such a press-fit state, the first projection 40*e*1 and the second projection 40*e*2 easily deformable than the contact portion H deform while the contact portion H hardly deforms, making it possible to reduce the insertion force for inserting the shaft 32*a* into the developing gear 40. The deformations of the end faces of the first projection 40*e*1 and the second projection 40*e*2 hardly affect the deformation of the gear 40*a* of the developing gear 40, making it possible to prevent the deformation of the gear 40*a*.

The positional relation between the developing gear 40 and the developing roller 32 in the RY direction in FIG. 1 is determined by the contact portion H. This reduces assembling variations to provide a stable assembling state.

As illustrated in FIG. 1, the outer diameter D of the outer circumferential surface 32*c* of the shaft 32*a* is smaller than the outer diameter E of the inner circumferential surface 40*c* of the developing gear 40, and the outer circumferential surface 32*c* of the shaft 32*a* is brought into contact with the inner circumferential surface 40*c* of the hole 40*b* at the contact portion H. Accordingly, the shaft center 32*e*, which is the center of the outer circumferential surface 32*c*, is deviated from the hole center 40*f* of the inner circumferential surface 40*c* in a direction away from the first projection 40*e*1 (second projection 40*e*2) in the RY direction. As described above, the gear center 40*g* (center of the pitch circle) of the developing gear 40 is deviated from the hole center 40*f* by a difference ΔRY (=Y2−Y1) in a direction away from the first projection 40*e*1 (second projection 40*e*2) in the RY direction. Desirably, the difference ΔRY is equal to or close to the difference between the outer diameter D of the outer circumferential surface 32*c* of the shaft 32*a* and the outer diameter E of the inner circumferential surface 40*c* of the developing gear 40. Although ΔRY is set to 20 to 50 micrometers (μm) according to the present exemplary embodiment, the present disclosure is not limited thereto. The distance between the shaft center 32*e* of the developing roller 32 inserted into the developing gear 40 and the gear center 40*g* of the developing gear 40 is shorter than the relevant distance in the conventional configuration where the gear center 40*g* coincides with the gear hole center. This reduces the rotational variation of the developing roller 32, making it possible to prevent the occurrence of an image unevenness.

A second exemplary embodiment of the present disclosure will be described below with reference to FIG. 19. In the following descriptions, components similar to those in the first exemplary embodiment are assigned the same reference numerals as those in the first exemplary embodiment, and redundant descriptions thereof will be omitted.

Figure 19:
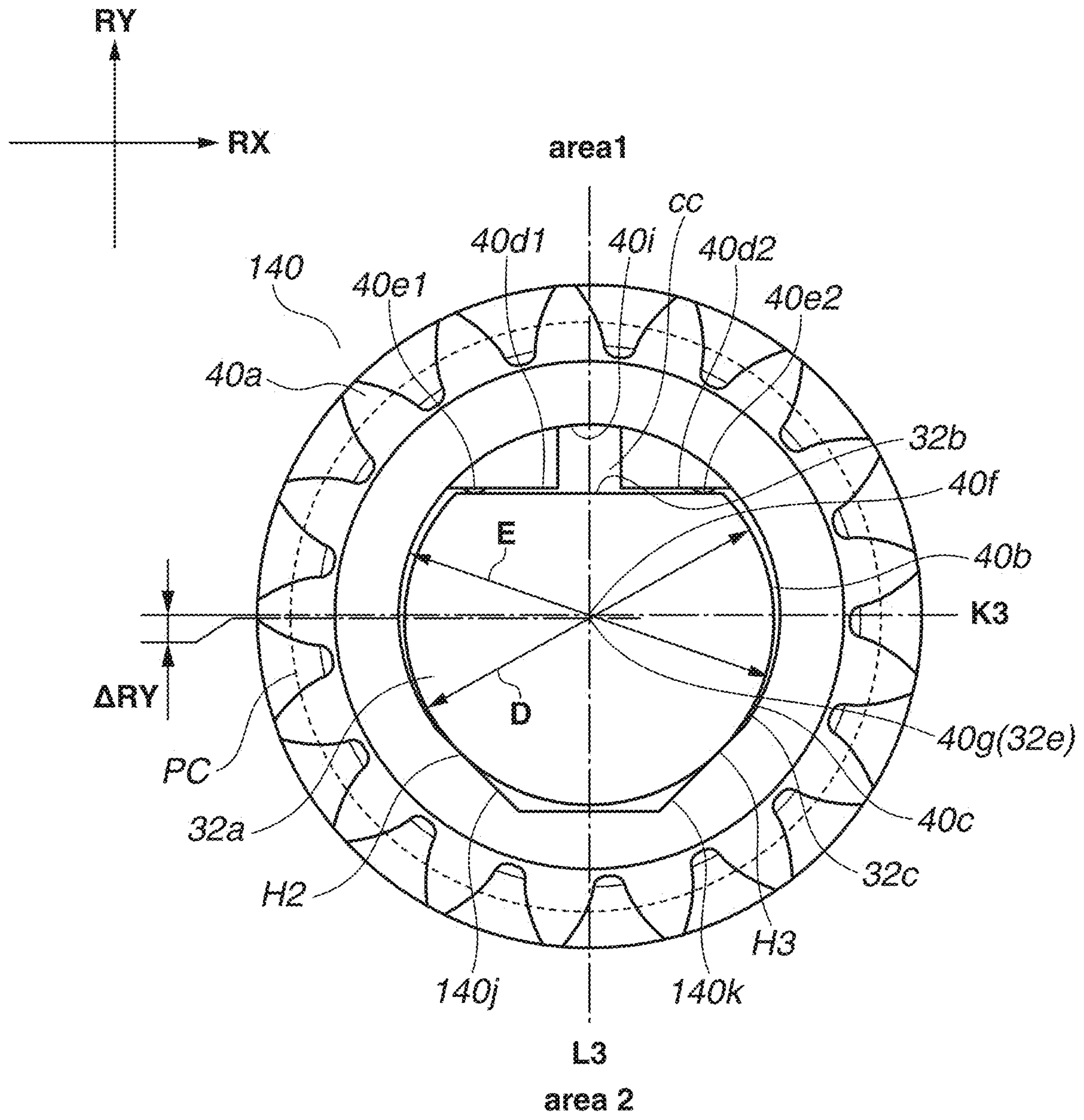
FIG. 19 is a front view illustrating the developing gear with the developing roller according to a second exemplary embodiment inserted.

FIG. 19 is a front view illustrating the developing gear 140 after the shaft 32*a* of the developing roller 32 is inserted into a hole of the developing gear 140 according to the second exemplary embodiment.

The present exemplary embodiment differs from the first exemplary embodiment in that the inner peripheral surface of the hole of the developing gear 140 includes a second inner flat surface 140*j* and a third inner flat surface 140*k*. As illustrated in FIG. 19, the second inner flat surface 140*j* and the third inner flat surface 140*k* are disposed in the area 2 according to the first exemplary embodiment. The second inner flat surface 140*j* is disposed on the side opposite to the third inner flat surface 140*k* with respect to the virtual straight line L1.

Like the first exemplary embodiment, as illustrated in FIG. 19, when the shaft 32*a* of the developing roller 32 is inserted into the developing gear 140, the outer circumferential surface 32*c* comes into contact with a contact portion H2 of the second inner flat surface 140*j* and a contact portion H3 of the third inner flat surface 140*k*. Like the first exemplary embodiment, the gear center 40*g* (second center) of the developing gear 140 coincides with or comes close to the shaft center 32*e*, and the position of the developing gear 140 relative to the developing roller 32 in the RX direction is determined. This reduces the rotational variation of the developing roller 32, making it possible to prevent the occurrence of an image unevenness.

A third exemplary embodiment of the present disclosure will be described below with reference to FIG. 20. In the following descriptions, components similar to those in the first exemplary embodiment are assigned the same reference numerals as those in the first exemplary embodiment, and redundant descriptions thereof will be omitted.

Figure 20:
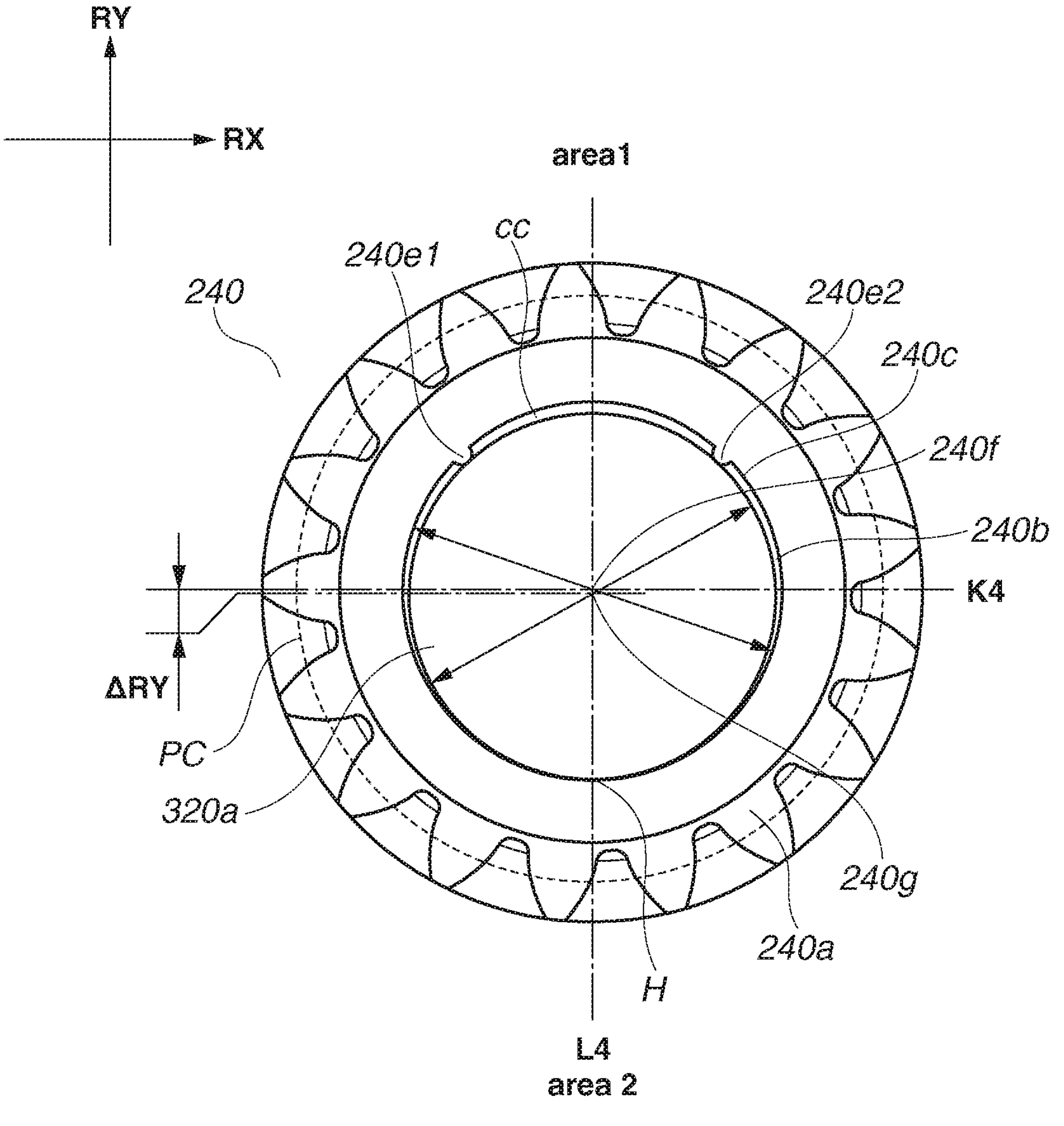
FIG. 20 is a front view illustrating the developing gear with the developing roller according to a third exemplary embodiment inserted.

FIG. 20 is a front view illustrating the developing gear 240 after the shaft 320*a* of the developing roller 32 is inserted into the hole 240*b* of the developing gear 240 according to the third exemplary embodiment. Like the first exemplary embodiment, the hole 240*b* of the developing gear 240 is formed on the inner peripheral surface of the inner circumferential surface 240*c*.

When viewed along the RZ direction, the hole 240*b* includes the inner circumferential surface 240*c*, and a first projection 240*e*1 and a second projection 240*e*2 inwardly projecting from the inner circumferential surface 240*c*. The present exemplary embodiment differs from the first and the second exemplary embodiments in that the hole 240*b* of the developing gear 240 has no inner flat surface.

When viewed along the RZ direction, the center of the inner circumferential surface 240*c* of the hole 240*b* is referred to as a hole center 240*f* (first center), the direction in which the first projection 240*e*1 and the second projection 240*e*2 are arranged is the RX direction, and the direction perpendicular to the RX direction is the RY direction. Further, when viewed along the RZ direction, the two areas divided by a virtual straight line K4 passing through the hole center 240*f* and parallel to the RX direction are a first area (area 1) and a second area (area 2). The first projection 240*e*1 and the second projection 240*e*2 are disposed on the sides opposite to each other across the concave portion cc in the RX direction in FIG. 20. The concave portion cc is disposed at a position through which a virtual straight line L4 passes.

The first projection 240*e*1 and the second projection 240*e*2 exist in the first area. Like the first exemplary embodiment, the gear center 240*g* of the gear 240*a* (center of the pitch circle PC) is deviated from the hole center 240*f* of the inner circumferential surface 240*c* of the hole 240*b* by the difference ΔRY in a direction away from the first projection 240*e*1 (second projection 240*e*2). More specifically, the gear center 240*g* exists in the area 2. The difference ΔRY is set according to the same technical concept as the first exemplary embodiment.

Thus, a shaft center of the shaft 320*a* coincides with or is close to the gear center 240*g*. This reduces the rotational speed variation of the developing roller 32, making it possible to prevent the occurrence of an image unevenness.

A fourth exemplary embodiment of the present disclosure will be described below with reference to FIG. 21. In the following descriptions, components similar to those in the first exemplary embodiment are assigned the same reference numerals as those in the first exemplary embodiment, and redundant descriptions thereof will be omitted.

Figure 21:
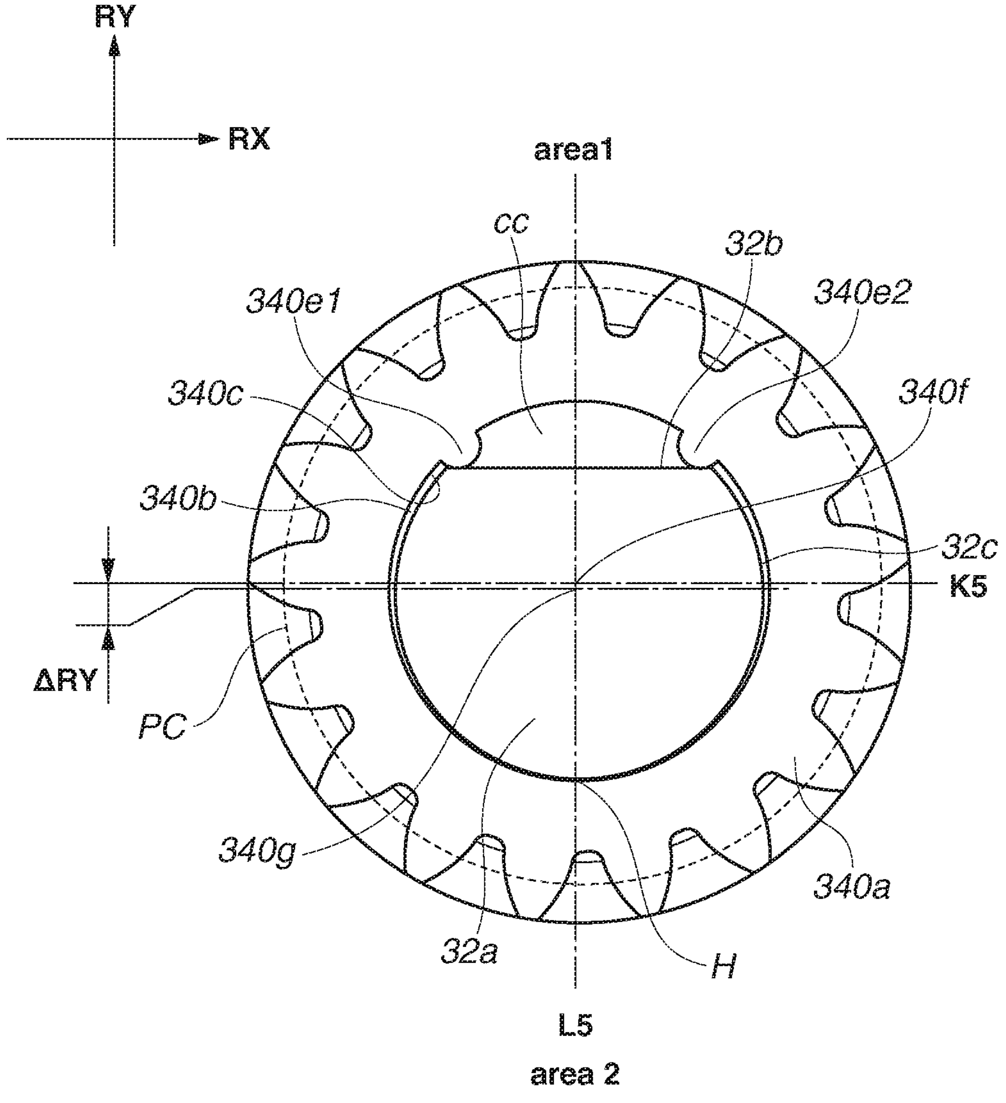
FIG. 21 is a front view illustrating the developing gear with the developing roller according a fourth exemplary embodiment inserted.

FIG. 21 is a front view illustrating a developing gear after the shaft 32*a* of the developing roller 32 is inserted into the hole 340*b* of the developing gear 340 according to the fourth exemplary embodiment. When viewed along the RZ direction, the hole 340*b* of the developing gear has the inner circumferential surface 340*c*, and the first projection 340*e*1 and the second projection 340*e*2 inwardly projecting from the inner circumferential surface 340*c*. Further, the first projection 340*e*1 and the second projection 340*e*2 are disposed on the sides opposite to each other with respect to a virtual straight line L5 that is parallel to the RY direction and passes through the hole center 340*f*. The first projection 340*e*1 and the second projection 340*e*2 are disposed on the sides opposite to each other across the concave portion cc in the RX direction in FIG. 21. The concave portion cc is disposed at a position through which the virtual straight line L5 passes. Like the hole 240*b* of the developing gear 240 according to the third exemplary embodiment, the hole 340*b* of the developing gear 340 has no inner flat surface.

When viewed along the RZ direction, the center of the inner circumferential surface 340*c* is referred to as a hole center 340*f* (first center), the direction in which the first projection 340*e*1 and the second projection 340*e*2 are arranged is the RX direction, and the direction perpendicular to the RX direction is the RY direction. Further, when viewed along the RZ direction, the two areas divided by the virtual straight line K5 passing through the hole center 340*f* and parallel to the RX direction are a first area (area 1) and a second area (area 2). The gear center 340*g* of the gear 340*a* (center of the pitch circle PC) is deviated from the hole center 340*f* by the difference ΔRY in a direction away from the first projection 340*e*1 (second projection 340*e*2) in the RY direction. More specifically, the gear center 340*g* exists in the area 2. The difference ΔRY is set according to the same technical concept as the first exemplary embodiment.

The above-described configuration allows the shaft center of the developing roller 32 inserted into the developing gear 240 and the gear center 240*g* to coincide with or be close to each other, reducing the rotational variation of the developing roller 32 and preventing the occurrence of an image unevenness of the developing roller 32.

The first to the fourth exemplary embodiments have been described above centering on the developing gear 240 fixed to the developing roller 32, the supply gear 41 fixed to the supply roller 33 and the stirring member 35 also have a similar configuration.

Further, the gear fixing configuration according to the first to the fourth exemplary embodiments is applicable to gear parts for rotating rollers (rotating bodies) in addition to the process cartridge P. For example, the gear fixing configuration is also applicable to a case where the photosensitive drum 12 and the charging roller 13 are rotated with gears.

The gear fixing configuration according to the first to the fourth exemplary embodiments is applied to the process cartridge P attachable to or detachable from the apparatus main body. However, the gear fixing configuration may be applied to the development apparatus built in the apparatus main body or a roller driving apparatus for driving other rollers (rotating bodies) and provides a similar effect.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2023-173396, filed Oct. 5, 2023, which is hereby incorporated by reference herein in its entirety.

What is claimed is:

1. A roller driving apparatus used in an image forming apparatus, the roller driving apparatus comprising:

a roller having a shaft and configured to be rotatably driven; and a gear fixed to a first end portion of the shaft in a longitudinal direction of the roller, wherein the gear includes:

when viewed along the longitudinal direction, a hole into which the first end portion of the shaft is inserted and formed of an inner peripheral surface including an inner circumferential surface centering on a first center;

a projection, in a case where two areas divided by a virtual line passing through the first center are a first area and a second area, disposed in the first area and projecting in a direction toward the first center relative to the inner peripheral surface; and a gear portion disposed so that a pitch circle is provided outside the hole in a radial direction centering on the first center, wherein the first end portion of the shaft is inserted into the hole of the gear in a press-fit state by at least a part of the projection of the gear being deformed, and wherein, when viewed along the longitudinal direction, a second center, which is a center of the pitch circle, is disposed in the second area.

2. The roller driving apparatus according to claim 1, wherein, when viewed along the longitudinal direction, the inner peripheral surface of the hole includes an inner flat surface, wherein, when viewed along the longitudinal direction, the first end portion of the shaft has an outer circumferential surface and an outer flat surface respectively facing the inner circumferential surface and the inner flat surface of the hole, wherein, when viewed along the longitudinal direction, the outer flat surface and the inner flat surface are disposed in the first area, and wherein the projection projects from the inner flat surface of the hole and contacts the outer flat surface of the shaft.

3. The roller driving apparatus according to claim 2, wherein, assuming that the inner flat surface and the projection are a first inner flat surface and a first projection, respectively, the inner peripheral surface of the hole includes a second inner flat surface parallel to the first inner flat surface, wherein the gear includes:

a second projection that projects from the second inner flat surface and contacts the outer flat surface of the shaft; and a concave portion recessed in a direction away from the first center and located between the first and the second inner flat surfaces, and wherein, when viewed along the longitudinal direction, the second inner flat surface, the second projection, and the concave portion are disposed in the first area.

4. The roller driving apparatus according to claim 2, wherein a radius of the outer circumferential surface of the shaft is smaller than a radius of the inner circumferential surface of the hole.

5. The roller driving apparatus according to claim 1, wherein, when viewed along the longitudinal direction, the first end portion of the shaft has an outer circumferential surface facing the inner circumferential surface of the hole, and an outer flat surface, wherein, assuming that the projection is a first projection, the first projection projects from the inner circumferential surface and comes into contact with the outer flat surface of the shaft, and wherein, when viewed along the longitudinal direction, the first area includes a second projection that projects from the inner circumferential surface in a direction approaching the first center and contacts the outer flat surface of the shaft, and a concave portion recessed in a direction away from the first center and located between the first and the second projections.

6. The roller driving apparatus according to claim 1, wherein, when viewed along the direction orthogonal to the longitudinal direction, the projection overlaps with the gear portion.

7. The roller driving apparatus according to claim 1, wherein the gear portion is a helical gear portion.

8. The roller driving apparatus according to claim 1, wherein the roller is a developing roller for supplying toner to a photosensitive drum.

9. The roller driving apparatus according to claim 1, further comprising a developing roller configured to supply toner to a photosensitive drum, wherein the roller is a toner supply roller for supplying toner to the developing roller.

10. The roller driving apparatus according to claim 1, wherein the roller driving apparatus is attachable to and detachable from an apparatus main body of the image forming apparatus.

11. The roller driving apparatus according to claim 10, further comprising a driving force reception member configured to receive a driving force from the apparatus main body, wherein the gear is configured to transmit the driving force transmitted from the driving force reception member to the roller.

12. The roller driving apparatus according to claim 1, wherein, when viewed along the longitudinal direction, the first end portion of the shaft has an outer circumferential surface facing the inner circumferential surface of the hole, and wherein a radius of the outer circumferential surface is smaller than a radius of the inner circumferential surface of the hole.

13. The roller driving apparatus according to claim 1, wherein, when viewed along the longitudinal direction, a distance between the first center and the second center in a direction away from the projection is 20 to 50 micrometers.

14. The roller driving apparatus according to claim 1, wherein, when viewed along the longitudinal direction and in a state where the first end portion of the shaft is press-fit into the hole, a shaft center of an outer circumferential surface of the shaft is closer to the second center than to the first center.

* * * * *